United States Patent
Stein

(10) Patent No.: US 10,609,503 B2
(45) Date of Patent: Mar. 31, 2020

(54) AMBISONIC DEPTH EXTRACTION

(71) Applicant: DTS, Inc., Calabasas, CA (US)

(72) Inventor: Edward Stein, Soquel, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

(21) Appl. No.: 16/212,387

(22) Filed: Dec. 6, 2018

(65) Prior Publication Data

US 2019/0313200 A1  Oct. 10, 2019

Related U.S. Application Data

(60) Provisional application No. 62/654,435, filed on Apr. 8, 2018.

(51) Int. Cl.
| | | |
|---|---|---|
| H04S 7/00 | (2006.01) | |
| G06F 3/0481 | (2013.01) | |
| H04S 3/00 | (2006.01) | |
| G06F 3/0484 | (2013.01) | |

(52) U.S. Cl.
CPC .......... H04S 7/303 (2013.01); G06F 3/04815 (2013.01); G06F 3/04845 (2013.01); G06F 3/04847 (2013.01); H04S 3/008 (2013.01); H04S 2400/01 (2013.01); H04S 2400/11 (2013.01); H04S 2420/01 (2013.01); H04S 2420/11 (2013.01)

(58) Field of Classification Search
CPC .. H04S 7/303; H04S 2400/01; H04S 2400/11; H04S 3/008
See application file for complete search history.

(56) References Cited

U.S. PATENT DOCUMENTS

| | | |
|---|---|---|
| 5,974,380 A | 10/1999 | Smyth et al. |
| 5,978,762 A | 11/1999 | Smyth et al. |
| 6,487,535 B1 | 11/2002 | Smyth et al. |
| 6,532,291 B1 | 3/2003 | McGrath |
| 9,179,236 B2 | 11/2015 | Robinson |
| 9,332,373 B2 | 5/2016 | Beaton et al. |
| 9,712,936 B2 | 7/2017 | Peters |

(Continued)

FOREIGN PATENT DOCUMENTS

| | | |
|---|---|---|
| TW | 201810249 A | 3/2018 |
| WO | WO-2009046223 A2 | 4/2009 |

(Continued)

OTHER PUBLICATIONS

"U.S. Appl. No. 15/625,913, Corrected Notice of Allowability dated Oct. 30, 2018", 2 pgs.

(Continued)

*Primary Examiner* — Regina N Holder

(74) *Attorney, Agent, or Firm* — Schwegman Lundberg & Woessner, P.A.

(57) ABSTRACT

The systems and methods described herein can be configured to identify, manipulate, and render different audio source components from encoded 3D audio mixes, such as can include content mixed for azimuth, elevation, and/or depth relative to a listener. The systems and methods can be configured to decouple depth encoding and decoding to permit spatial performance to be tailored to a particular playback environment or platform. In an example, the systems and methods improve rendering in applications that involve listener tracking, including tracking over six degrees of freedom (e.g., yaw, pitch, roll orientation, and x, y, z position).

20 Claims, 23 Drawing Sheets

(56) References Cited

U.S. PATENT DOCUMENTS

| | | |
|---|---|---|
| 9,800,991 B2 | 10/2017 | Robinson et al. |
| 9,942,688 B2 | 4/2018 | Robinson et al. |
| 9,973,874 B2 | 5/2018 | Stein et al. |
| 10,200,806 B2 | 2/2019 | Stein et al. |
| 10,231,073 B2 | 3/2019 | Stein et al. |
| 2003/0227476 A1 | 12/2003 | Wilcock et al. |
| 2005/0179701 A1 | 8/2005 | Jahnke |
| 2007/0269063 A1 | 11/2007 | Goodwin et al. |
| 2009/0046864 A1 | 2/2009 | Mahabub et al. |
| 2009/0092259 A1 | 4/2009 | Jot et al. |
| 2009/0252356 A1 | 10/2009 | Goodwin et al. |
| 2011/0157327 A1 | 6/2011 | Seshadri et al. |
| 2012/0224456 A1 | 9/2012 | Visser et al. |
| 2013/0121515 A1 | 5/2013 | Hooley et al. |
| 2013/0317783 A1 | 11/2013 | Tennant |
| 2014/0037117 A1 | 2/2014 | Tsingos et al. |
| 2015/0055783 A1 | 2/2015 | Luo et al. |
| 2015/0063610 A1 | 3/2015 | Mossner |
| 2016/0021476 A1 | 1/2016 | Robinson et al. |
| 2016/0119734 A1 | 4/2016 | Sladeczek et al. |
| 2016/0134988 A1 | 5/2016 | Gorzel et al. |
| 2016/0227338 A1 | 8/2016 | Oh et al. |
| 2017/0215020 A1 | 7/2017 | Robinson et al. |
| 2017/0295446 A1 | 10/2017 | Thagadur |
| 2017/0366912 A1 | 12/2017 | Stein et al. |
| 2017/0366913 A1 | 12/2017 | Stein et al. |
| 2017/0366914 A1 | 12/2017 | Stein et al. |
| 2018/0027352 A1 | 1/2018 | Robinson et al. |
| 2019/0215638 A1 | 7/2019 | Stein et al. |

FOREIGN PATENT DOCUMENTS

| | | |
|---|---|---|
| WO | WO-2016133785 A1 | 8/2016 |
| WO | WO-2017218973 A1 | 12/2017 |
| WO | WO-2019199359 A1 | 10/2019 |

OTHER PUBLICATIONS

"U.S. Appl. No. 15/625,913, Non Final Office Action dated Jun. 15, 2018", 4 pgs.

"U.S. Appl. No. 15/625,913, Notice of Allowance dated Sep. 25, 2018", 7 pgs.

"U.S. Appl. No. 15/625,913, Response filed Aug. 14, 2018 to Non Final Office Action dated Jun. 15, 2018", 8 pgs.

"U.S. Appl. No. 15/625,927, Notice of Allowance dated Jan. 4, 2018", 11 pgs.

"U.S. Appl. No. 15/625,937, Non Final Office Action dated Apr. 4, 2018", 10 pgs.

"U.S. Appl. No. 15/625,937, Notice of Allowability dated Dec. 13, 2018", 2 pgs.

"U.S. Appl. No. 15/625,937, Notice of Allowance dated Oct. 23, 2018", 5 pgs.

"U.S. Appl. No. 15/625,937, Response filed Sep. 4, 2018 to Non Final Office Action mailed Apr. 4, 2018", 13 pgs.

"International Application Serial No. PCT/US2017/038001, International Search Report dated Aug. 8, 2017", 2 pgs.

"International Application Serial No. PCT/US2017/038001, Written Opinion dated Sep. 8, 2017", 7 pgs.

Jot, Jean-Marc, "Real-time Spatial Processing of sounds for music, multimedia and interactive human-computer interfaces", IRCAM, 1 place Igor-Stravinsky, (Feb. 1997), 1-22.

Stein, Edward, "Extended Depth Ambisonics Rendering with Six Degrees of Freedom", Proceedings of the 21st International Conference on Digital Audio Effects (DAFx-18), (2018), 7 pgs.

"International Application Serial No. PCT/US2017/038001, International Preliminary Report on Patentability dated Dec. 27, 2018", 9 pgs.

"International Application Serial No. PCT/US2018/064299, International Search Report dated Feb. 11, 2019", 2 pgs.

"International Application Serial No. PCT/US2018/064299, Written Opinion dated Feb. 11, 2019", 6 pgs.

"U.S. Appl. No. 16/235,854, Non Final Office Action dated Sep. 12, 2019", 6 pgs.

"U.S. Appl. No. 16/235,854, Response filed Dec. 12, 2019 to Non Final Office Action dated Sep. 12, 2019", 10 pgs.

Penha, Rui, "Distance Encoding in Ambisonics Using Three Angular Coordinates", Proceedings of the Sound and Music Computing Conference, (2008).

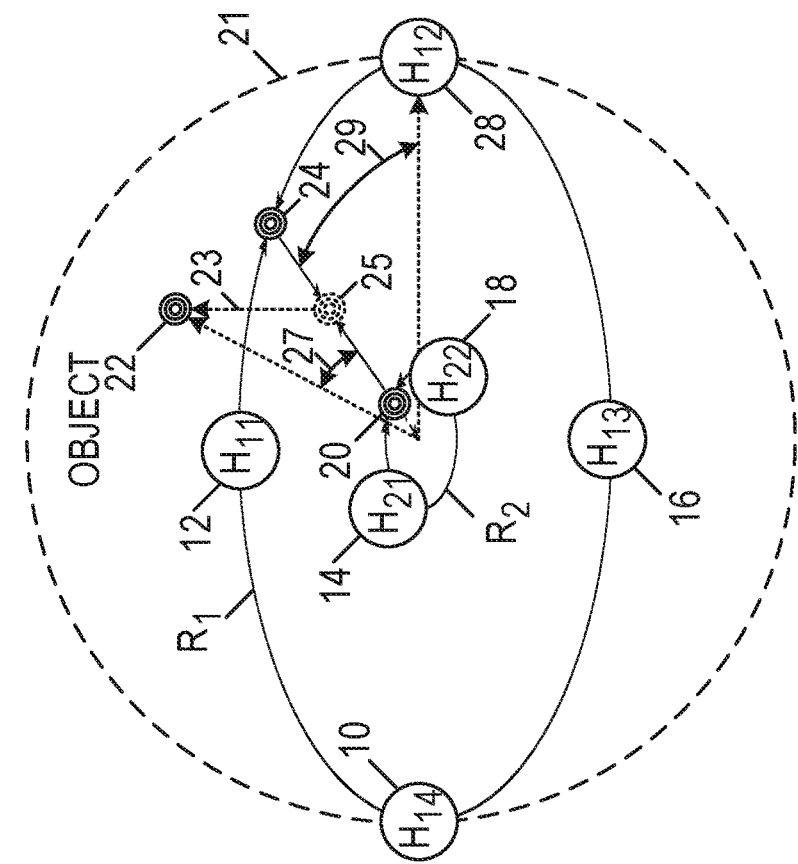
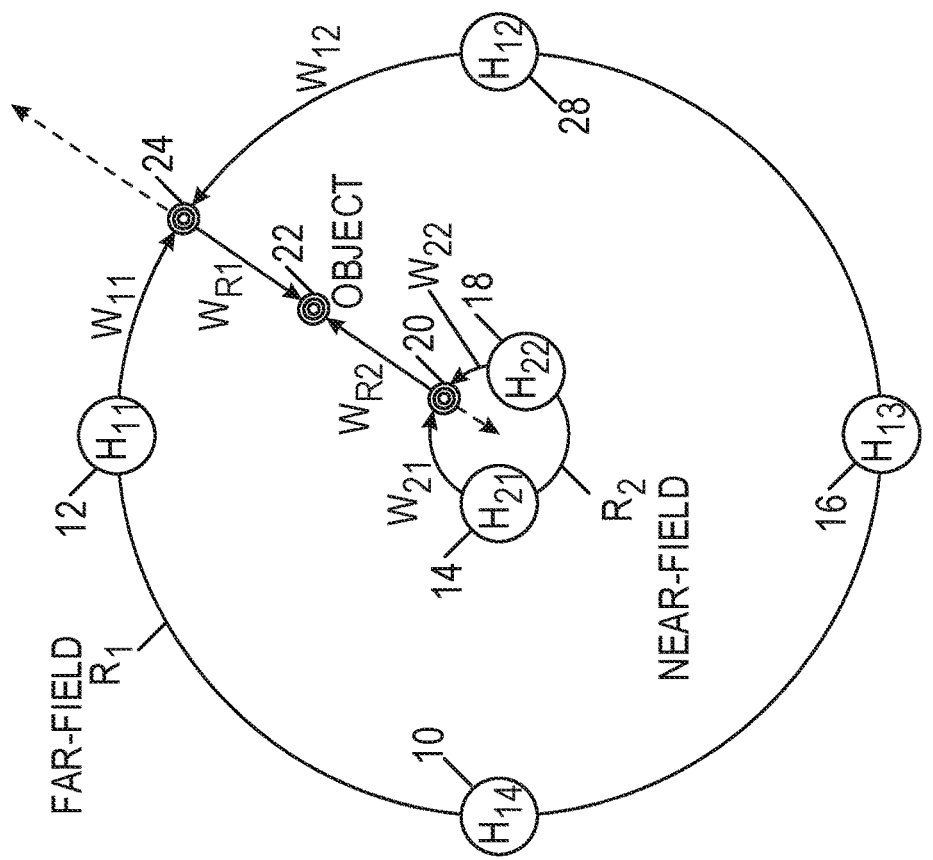
FIG. 1B
FIG. 1A

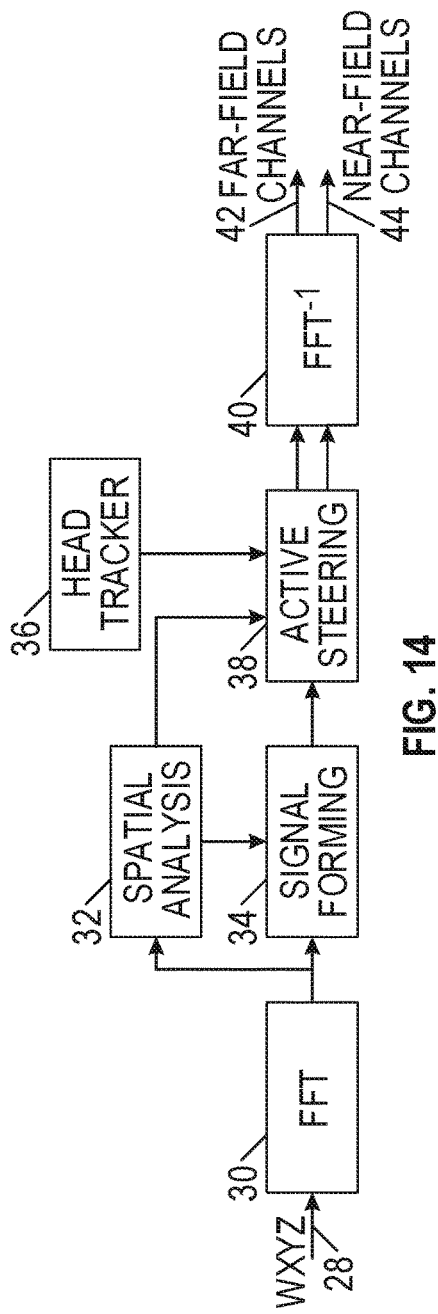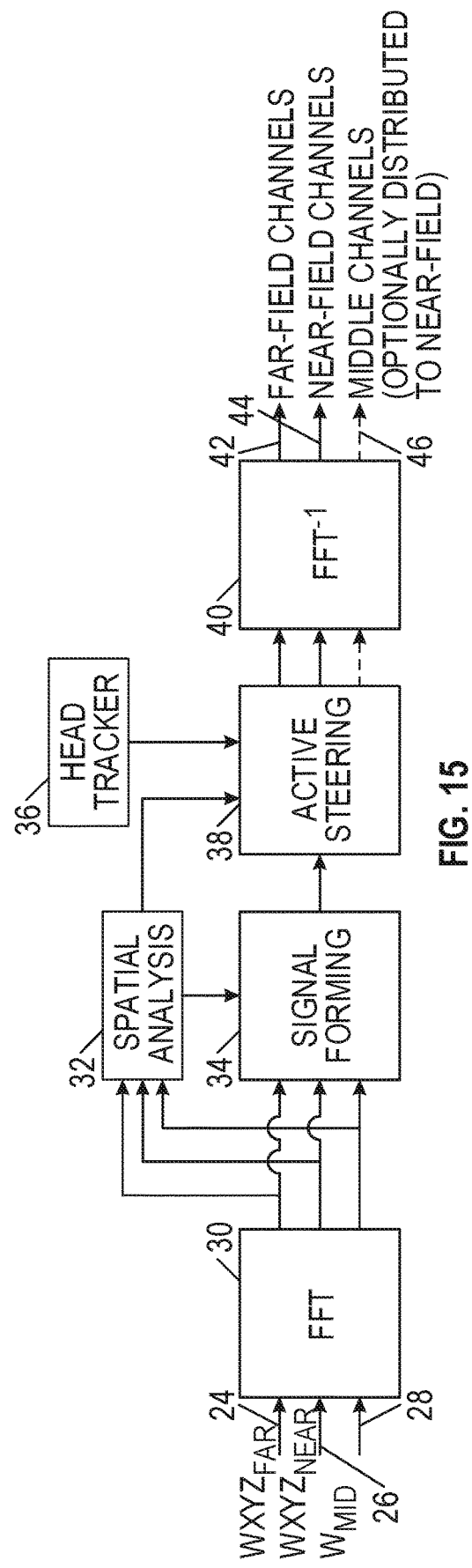

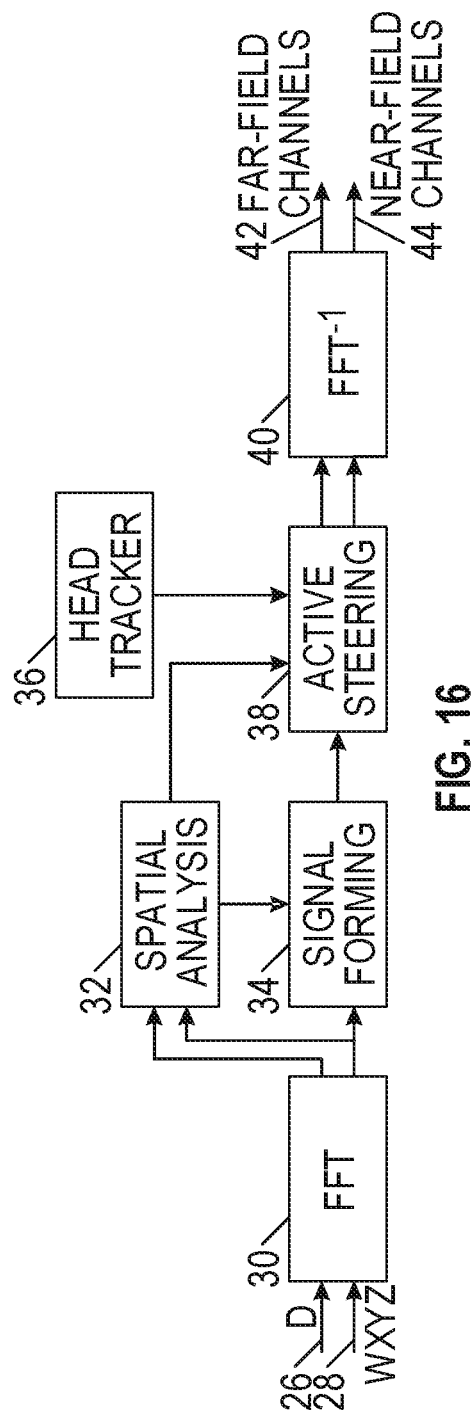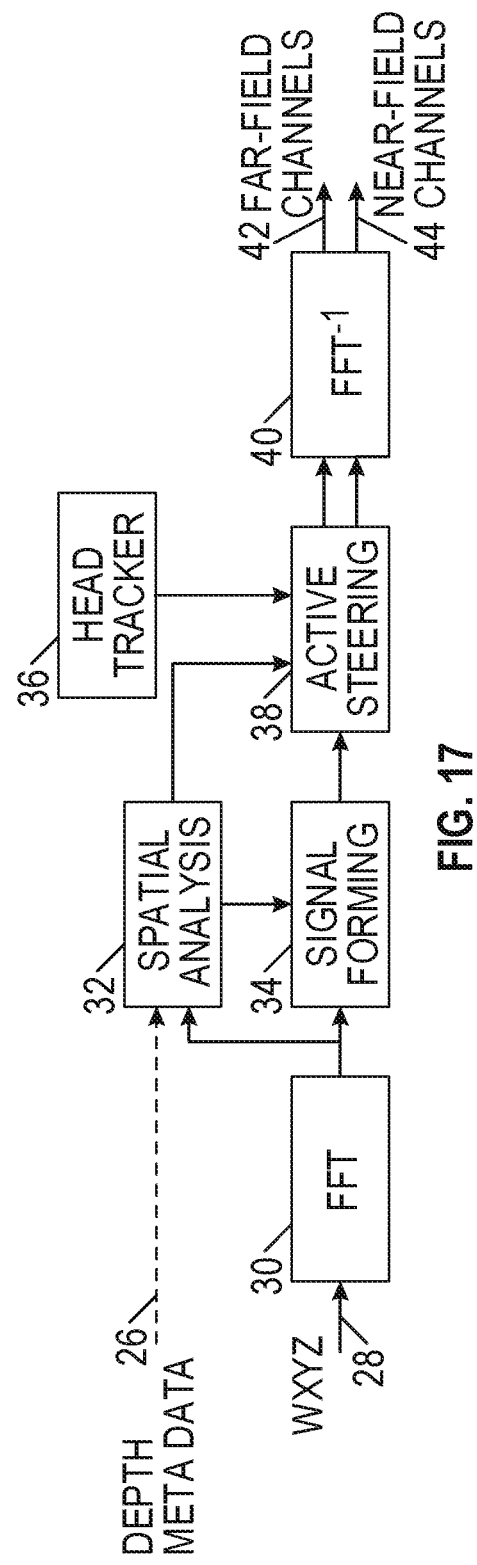

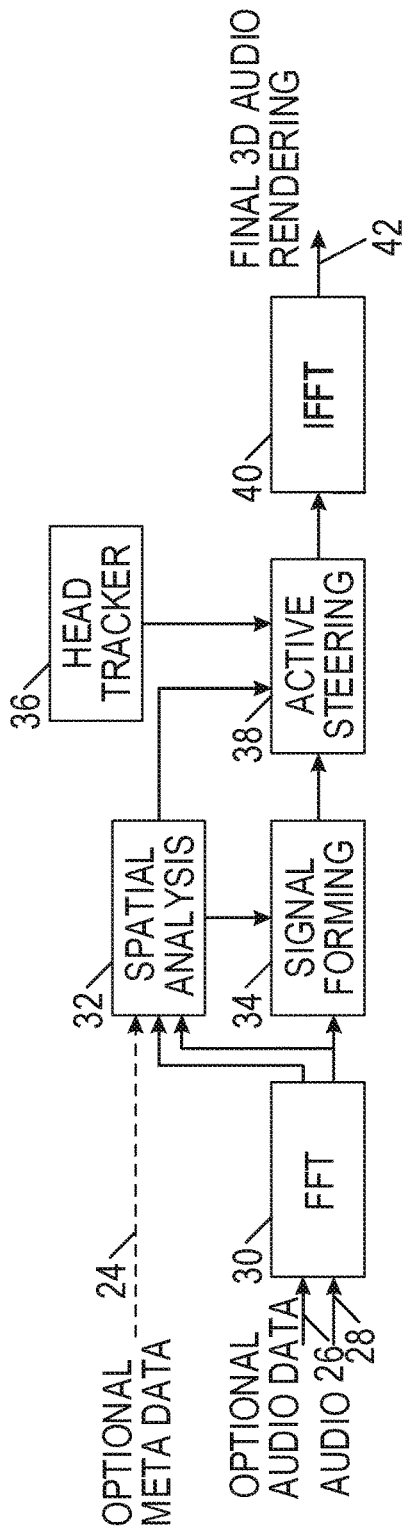
FIG. 19
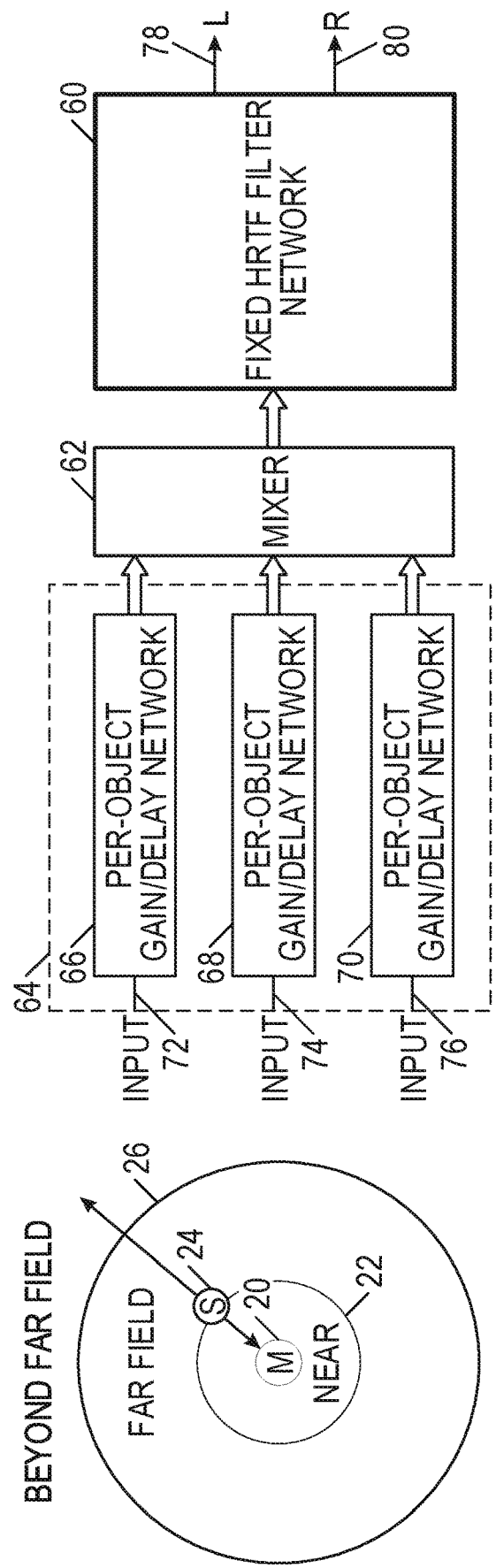
FIG. 21
FIG. 20

AMBISONIC DEPTH EXTRACTION

RELATED APPLICATION AND PRIORITY CLAIM

This application is related and claims priority to U.S. Provisional Application No. 62/654,435, filed on Apr. 8, 2018, and entitled "Single Depth Extraction from Extended Depth Ambisonics/ESAF," the entirety of which is incorporated herein by reference.

TECHNICAL FIELD

The technology described in this patent document relates to systems and methods for synthesizing spatial audio in a sound reproduction system.

BACKGROUND

Spatial audio reproduction has interested audio engineers and the consumer electronics industry for several decades. Spatial sound reproduction requires a two-channel or multi-channel electro-acoustic system (e.g., loudspeakers, headphones) which must be configured according to the context of the application (e.g., concert performance, motion picture theater, domestic hi-fi installation, computer display, individual head-mounted display), further described in Jot, Jean-Marc, "Real-time Spatial Processing of Sounds for Music, Multimedia and Interactive Human-Computer Interfaces," IRCAM, 1 Place Igor-Stravinsky 1997, (hereinafter "Jot, 1997"), incorporated herein by reference.

The development of audio recording and reproduction techniques for the motion picture and home video entertainment industry has resulted in the standardization of various multi-channel "surround sound" recording formats (most notably the 5.1 and 7.1 formats). Various audio recording formats have been developed for encoding three-dimensional audio cues in a recording. These 3-D audio formats include Ambisonics and discrete multi-channel audio formats comprising elevated loudspeaker channels, such as the NHK 22.2 format.

A downmix is included in the soundtrack data stream of various multi-channel digital audio formats, such as DTS-ES and DTS-HD from DTS, Inc. of Calabasas, Calif. This downmix is backward-compatible, and can be decoded by legacy decoders and reproduced on existing playback equipment. This downmix includes a data stream extension that carries additional audio channels that are ignored by legacy decoders but can be used by non-legacy decoders. For example, a DTS-HD decoder can recover these additional channels, subtract their contribution in the backward-compatible downmix, and render them in a target spatial audio format different from the backward-compatible format, which can include elevated loudspeaker positions. In DTS-HD, the contribution of additional channels in the backward-compatible mix and in the target spatial audio format is described by a set of mixing coefficients (e.g., one for each loudspeaker channel). The target spatial audio formats for which the soundtrack is intended is specified at the encoding stage.

This approach allows for the encoding of a multi-channel audio soundtrack in the form of a data stream compatible with legacy surround sound decoders and one or more alternative target spatial audio formats also selected during the encoding/production stage. These alternative target formats may include formats suitable for the improved reproduction of three-dimensional audio cues. However, one limitation of this scheme is that encoding the same soundtrack for another target spatial audio format requires returning to the production facility in order to record and encode a new version of the soundtrack that is mixed for the new format.

Object-based audio scene coding offers a general solution for soundtrack encoding independent from the target spatial audio format. An example of object-based audio scene coding system is the MPEG-4 Advanced. Audio Binary Format for Scenes (AABIFS). In this approach, each of the source signals is transmitted individually, along with a render cue data stream. This data stream carries time-varying values of the parameters of a spatial audio scene rendering system. This set of parameters may be provided in the form of a format-independent audio scene description, such that the soundtrack may be rendered in any target spatial audio format by designing the rendering system according to this format. Each source signal, in combination with its associated render cues, defines an "audio object." This approach enables the renderer to implement the most accurate spatial audio synthesis technique available to render each audio object in any target spatial audio format selected at the reproduction end. Object-based audio scene coding systems also allow for interactive modifications of the rendered audio scene at the decoding stage, including remixing, music re-interpretation (e.g., karaoke), or virtual navigation in the scene (e.g., video gaming).

The need for low-bit-rate transmission or storage of multi-channel audio signal has motivated the development of new frequency-domain Spatial Audio Coding (SAC) techniques, including Binaural Cue Coding (BCC) and MPEG-Surround. In an exemplary SAC technique, an M-channel audio signal is encoded in the form of a downmix audio signal accompanied by a spatial cue data stream that describes the inter-channel relationships present in the original M-channel signal (inter-channel correlation and level differences) in the time-frequency domain. Because the downmix signal comprises fewer than M audio channels and the spatial cue data rate is small compared to the audio signal data rate, this coding approach reduces the data rate significantly. Additionally, the downmix format may be chosen to facilitate backward compatibility with legacy equipment.

In a variant of this approach, called Spatial Audio Scene Coding (SASC) as described in U.S. Patent Application No. 2007/0269063, the time-frequency spatial cue data transmitted to the decoder are format independent. This enables spatial reproduction in any target spatial audio format, while retaining the ability to carry a backward-compatible downmix signal in the encoded soundtrack data stream. However, in this approach, the encoded soundtrack data does not define separable audio objects. In most recordings, multiple sound sources located at different positions in the sound scene are concurrent in the time-frequency domain. In this case, the spatial audio decoder is not able to separate their contributions in the downmix audio signal. As a result, the spatial fidelity of the audio reproduction may be compromised by spatial localization errors.

MPEG Spatial Audio Object Coding (SAOC) is similar to MPEG-Surround in that the encoded soundtrack data stream includes a backward-compatible downmix audio signal along with a time-frequency cue data stream. SAOC is a multiple object coding technique designed to transmit a number M of audio objects in a mono or two-channel downmix audio signal. The SAOC cue data stream transmitted along with the SAOC downmix signal includes time-frequency object mix cues that describe, in each frequency sub-band, the mixing coefficient applied to each object input signal in each channel of the mono or two-channel downmix signal. Additionally, the SAOC cue data stream includes frequency domain object separation cues that allow the audio objects to be post-processed individually at the decoder side. The object post-processing functions provided in the SAOC decoder mimic the capabilities of an object-based spatial audio scene rendering system and support multiple target spatial audio formats.

SAOC provides a method for low-bit-rate transmission and computationally efficient spatial audio rendering of multiple audio object signals along with an object-based and format independent three-dimensional audio scene description. However, the legacy compatibility of a SAOC encoded stream is limited to two-channel stereo reproduction of the SAOC audio downmix signal, and is therefore not suitable for extending existing multi-channel surround-sound coding formats. Furthermore, it should be noted that the SAOC downmix signal is not perceptually representative of the rendered audio scene if the rendering operations applied in the SAOC decoder on the audio object signals include certain types of post-processing effects, such as artificial reverberation (because these effects would be audible in the rendering scene but are not simultaneously incorporated in the downmix signal, which contains the unprocessed object signals).

Additionally, SAOC suffers from the same limitation as the SAC and SASC techniques: the SAOC decoder cannot fully separate in the downmix signal the audio object signals that are concurrent in the time-frequency domain. For example, extensive amplification or attenuation of an object by the SAOC decoder typically yields an unacceptable decrease in the audio quality of the rendered scene.

A spatially encoded soundtrack may be produced by two complementary approaches: (a) recording an existing sound scene with a coincident or closely-spaced microphone system (placed essentially at or near the virtual position of the listener within the scene) or (b) synthesizing a virtual sound scene.

The first approach, which uses traditional 3D binaural audio recording, arguably creates as close to the 'you are there' experience as possible through the use of 'dummy head' microphones. In this case, a sound scene is captured live, generally using an acoustic mannequin with microphones placed at the ears. Binaural reproduction, where the recorded audio is replayed at the ears over headphones, is then used to recreate the original spatial perception. One of the limitations of traditional dummy head recordings is that they can only capture live events and only from the dummy's perspective and head orientation.

With the second approach, digital signal processing (DSP) techniques have been developed to emulate binaural listening by sampling a selection of head related transfer functions (HRTFs) around a dummy head (or a human head with probe microphones inserted into the ear canal) and interpolating those measurements to approximate an HRTF that would have been measured for any location in-between. The most common technique is to convert all measured ipsilateral and contralateral HRTFs to minimum phase and to perform a linear interpolation between them to derive an HRTF pair. The HRTF pair combined with an appropriate interaural time delay (ITD) represents the HRTFs for the desired synthetic location. This interpolation is generally performed in the time domain, which typically includes a linear combination of time-domain filters. The interpolation may also include frequency domain analysis (e.g., analysis performed on one or more frequency subbands), followed by a linear interpolation between or among frequency domain analysis outputs. Time domain analysis may provide more computationally efficient results, whereas frequency domain analysis may provide more accurate results. In some embodiments, the interpolation may include a combination of time domain analysis and frequency domain analysis, such as time-frequency analysis. Distance cues may be simulated by reducing the gain of the source in relation to the emulated distance.

This approach has been used for emulating sound sources in the far-field, where interaural HRTF differences have negligible change with distance. However, as the source gets closer and closer to the head (e.g., "near-field"), the size of the head becomes significant relative to the distance of the sound source. The location of this transition varies with frequency, but convention says that the source is beyond about 1 meter (e.g., "far-field"). As the sound source goes further into the listener's near-field, interaural HRTF changes become significant, especially at lower frequencies.

Some HRTF-based rendering engines use a database of far-field HRTF measurements, which include all measured at a constant radial distance from the listener. As a result, it is difficult to emulate the changing frequency-dependent HRTF cues accurately for a sound source that is much closer than the original measurements within the far-field HRTF database.

Many modern 3D audio spatialization products choose to ignore the near-field as the complexities of modeling near-field HRTFs have traditionally been too costly and near-field acoustic events have not traditionally been very common in typical interactive audio simulations. However, the advent of virtual reality (VR) and augmented reality (AR) applications has resulted in several applications in which virtual objects will often occur closer to the user's head. More accurate audio simulations of such objects and events have become a necessity.

Previously known HRTF-based 3D audio synthesis models make use of a single set of HRTF pairs (i.e., ipsilateral and contralateral) that are measured at a fixed distance around a listener. These measurements usually take place in the far-field, where the HRTF does not change significantly with increasing distance. As a result, sound sources that are farther away can be emulated by filtering the source through an appropriate pair of far-field HRTF filters and scaling the resulting signal according to frequency-independent gains that emulate energy loss with distance (e.g., the inverse-square law).

However, as sounds get closer and closer to the head, at the same angle of incidence, the HRTF frequency response can change significantly relative to each ear and can no longer be effectively emulated with far-field measurements. This scenario, emulating the sound of objects as they get closer to the head, is particularly of interest for newer applications such as virtual reality, where closer examination and interaction with objects and avatars will become more prevalent.

Transmission of full 3D objects (e.g., audio and metadata position) has been used to enable headtracking and interaction, but such an approach requires multiple audio buffers per source and greatly increases in complexity the more sources are used. This approach may also require dynamic source management. Such methods cannot be easily integrated into existing audio formats. Multichannel mixes also have a fixed overhead for a fixed number of channels, but typically require high channel counts to establish sufficient spatial resolution. Existing scene encodings such as matrix encoding or Ambisonics have lower channel counts, but do not include a mechanism to indicate desired depth or distance of the audio signals from the listener.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 1A-1C are schematic diagrams of near-field and far-field rendering for an example audio source location.

FIG. 14 is a functional block diagram of an active decoder with headtracking.

FIG. 15 is a functional block diagram of an active decoder with depth and headtracking.

FIG. 16 is a functional block diagram of an alternative active decoder with depth and head tacking with a single steering channel 'D.'

FIG. 17 is a functional block diagram of an active decoder with depth and headtracking, with metadata depth only.

FIG. 19 shows a generalized architecture for active 3D audio decoding and rendering.

FIG. 20 shows an example of depth-based submixing for three depths.

FIG. 21 is a functional block diagram of a portion of an audio rendering apparatus.

DESCRIPTION OF EMBODIMENTS

Figure 1C:
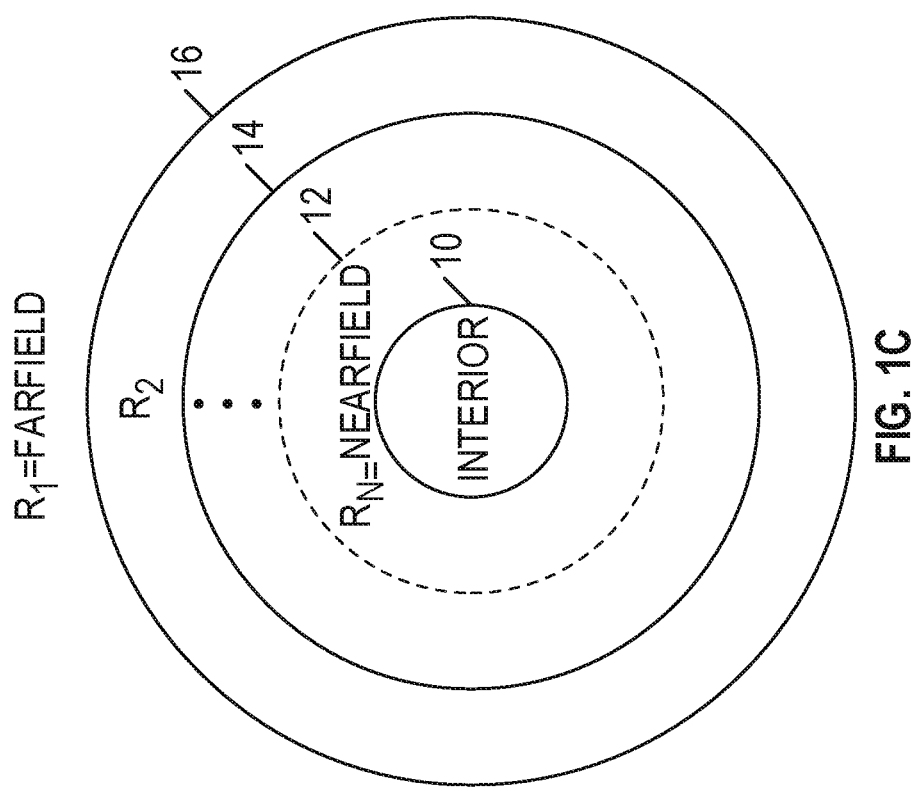

The methods and apparatus described herein optimally represent fill 3D audio mixes (e.g., azimuth, elevation, and depth) as "sound scenes" in which the decoding process facilitates head tracking. Sound scene rendering can be modified for the listener's orientation (e.g., yaw, pitch, roll) and 3D position (e.g., x, y, z). This provides the ability to treat sound scene source positions as 3D positions instead of being restricted to positions relative to the listener. Sound scene rendering can be augmented by encoding depth to a source directly. This provides the ability to modify the transmission format and panning equations to support adding depth indicators during content production. Unlike typical methods that apply depth cues such as loudness and reverberation changes in the mix, this method would enable recovering the distance of a source in the mix so that it can be rendered for the final playback capabilities rather than those on the production side. The systems and methods discussed herein can fully represent such scenes in any number of audio channels to provide compatibility with transmission through existing audio codecs such as DTS HD, yet carry substantially more information (e.g., depth, height) than a 7.1 channel mix. The methods can be easily decoded to any channel layout or through DTS Headphone: X, where the headtracking features will particularly benefit VR applications. The methods can also be employed in real-time for content production tools with VR monitoring, such as VR monitoring enabled by DTS Headphone:X. The full 3D headtracking of the decoder is also backward-compatible when receiving legacy 2D mixes (e.g., azimuth and elevation only).

General Definitions

The detailed description set forth below in connection with the appended drawings is intended as a description of the presently preferred embodiment of the present subject matter, and is not intended to represent the only form in which the present subject matter may be constructed or used. The description sets forth the functions and the sequence of steps for developing and operating the present subject matter in connection with the illustrated embodiment. It is to be understood that the same or equivalent functions and sequences may be accomplished by different embodiments that are also intended to be encompassed within the scope of the present subject matter. It is further understood that the use of relational terms (e.g., first, second) are used solely to distinguish one from another entity without necessarily requiring or implying any actual such relationship or order between such entities.

The present subject matter concerns processing audio signals (i.e., signals representing physical sound). These audio signals are represented by digital electronic signals. In the following discussion, analog waveforms may be shown or discussed to illustrate the concepts. However, it should be understood that typical embodiments of the present subject matter would operate in the context of a time series of digital bytes or words, where these bytes or words form a discrete approximation of an analog signal or ultimately a physical sound. The discrete, digital signal corresponds to a digital representation of a periodically sampled audio waveform.

For uniform sampling, the waveform is be sampled at or above a rate sufficient to satisfy the Nyquist sampling theorem for the frequencies of interest. In a typical embodiment, a uniform sampling rate of approximately 44,100 samples per second (e.g., 44.1 kHz) may be used, however higher sampling rates (e.g., 96 kHz, 128 kHz) may alternatively be used. The quantization scheme and bit resolution should be chosen to satisfy the requirements of a particular application, according to standard digital signal processing techniques. The techniques and apparatus of the present subject matter typically would be applied interdependently in a number of channels. For example, it could be used in the context of a "surround" audio system (e.g., having more than two channels).

As used herein, a "digital audio signal" or "audio signal" does not describe a mere mathematical abstraction, but instead denotes information embodied in or carried by a physical medium capable of detection by a machine or apparatus. These teens includes recorded or transmitted signals, and should be understood to include conveyance by any form of encoding, including pulse code modulation (PCM) or other encoding. Outputs, inputs, or intermediate audio signals could be encoded or compressed by any of various known methods, including MPEG, ATRAC, AC3, or the proprietary methods of DTS, Inc. as described in U.S. Pat. Nos. 5,974,380; 5,978,762; and 6,487,535. Some modification of the calculations may be required to accommodate a particular compression or encoding method, as will be apparent to those with skill in the art.

In software, an audio "codec" includes a computer program that formats digital audio data according to a given audio file format or streaming audio format. Most codecs are implemented as libraries that interface to one or more multimedia players, such as QuickTime Player, XMMS, Winamp, Windows Media Player, Pro Logic, or other codecs. In hardware, audio codec refers to a single or multiple devices that encode analog audio as digital signals and decode digital back into analog. In other words, it contains both an analog-to-digital converter (ADC) and a digital-to-analog converter (DAC) running off a common clock.

An audio codec may be implemented in a consumer electronics device, such as a DVD player, Blu-Ray player, TV tuner, CD player, handheld player, Internet audio/video device, gaming console, mobile phone, or another electronic device. A consumer electronic device includes a Central Processing Unit (CPU), which may represent one or more conventional types of such processors, such as an IBM PowerPC, Intel Pentium (x86) processors, or other processor. A Random Access Memory (RAM) temporarily stores results of the data processing operations performed by the CPU, and is interconnected thereto typically via a dedicated memory channel. The consumer electronic device may also include permanent storage devices such as a hard drive, which are also in communication with the CPU over an input/output (I/O) bus. Other types of storage devices such as tape drives, optical disk drives, or other storage devices may also be connected. A graphics card may also connected to the CPU via a video bus, where the graphics card transmits signals representative of display data to the display monitor. External peripheral data input devices, such as a keyboard or a mouse, may be connected to the audio reproduction system over a USB port. A USB controller translates data and instructions to and from the CPU for external peripherals connected to the USB port. Additional devices such as printers, microphones, speakers, or other devices may be connected to the consumer electronic device.

The consumer electronic device may use an operating system having a graphical user interface (GUI), such as WINDOWS from Microsoft Corporation of Redmond, Wash., MAC OS from Apple, Inc. of Cupertino, Calif., various versions of mobile GUIs designed for mobile operating systems such as Android, or other operating systems. The consumer electronic device may execute one or more computer programs. Generally, the operating system and computer programs are tangibly embodied in a computer-readable medium, where the computer-readable medium includes one or more of the fixed or removable data storage devices including the hard drive. Both the operating system and the computer programs may be loaded from the aforementioned data storage devices into the RAM for execution by the CPU. The computer programs may comprise instructions, which when read and executed by the CPU, cause the CPU to perform the steps to execute the steps or features of the present subject matter.

The audio codec may include various configurations or architectures. Any such configuration or architecture may be readily substituted without departing from the scope of the present subject matter. A person having ordinary skill in the art will recognize the above-described sequences are the most commonly used in computer-readable mediums, but there are other existing sequences that may be substituted without departing from the scope of the present subject matter.

Elements of one embodiment of the audio codec may be implemented by hardware, firmware, software, or any combination thereof. When implemented as hardware, the audio codec may be employed on a single audio signal processor or distributed amongst various processing components. When implemented in software, elements of an embodiment of the present subject matter may include code segments to perform the necessary tasks. The software preferably includes the actual code to carry out the operations described in one embodiment of the present subject matter, or includes code that emulates or simulates the operations. The program or code segments can be stored in a processor or machine accessible medium or transmitted by a computer data signal embodied in a carrier wave (e.g., a signal modulated by a carrier) over a transmission medium. The "processor readable or accessible medium" or "machine readable or accessible medium" may include any medium that can store, transmit, or transfer information.

Examples of the processor readable medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, or other media. The computer data signal may include any signal that can propagate over a transmission medium such as electronic network channels, optical fibers, air, electromagnetic, RF links, or other transmission media. The code segments may be downloaded via computer networks such as the Internet, intranet, or another network. The machine accessible medium may be embodied in an article of manufacture. The machine accessible medium may include data that, when accessed by a machine, cause the machine to perform the operation described in the following. The term "data" here refers to any type of information that is encoded for machine-readable purposes, which may include program, code, data, file, or other information.

All or part of an embodiment of the present subject matter may be implemented by software. The software may include several modules coupled to one another. A software module is coupled to another module to generate, transmit, receive, or process variables, parameters, arguments, pointers, results, updated variables, pointers, or other inputs or outputs. A software module may also be a software driver or interface to interact with the operating system being executed on the platform. A software module may also be a hardware driver to configure, set up, initialize, send, or receive data to or from a hardware device.

One embodiment of the present subject matter may be described as a process that is usually depicted as a flowchart, a flow diagram, a structure diagram, or a block diagram. Although a block diagram may describe the operations as a sequential process, many of the operations can be performed in parallel or concurrently. In addition, the order of the operations may be rearranged. A process may be terminated when its operations are completed. A process may correspond to a method, a program, a procedure, or other group of steps.

This description includes a method and apparatus for synthesizing audio signals, particularly in headphone (e.g., headset) applications. While aspects of the disclosure are presented in the context of exemplary systems that include headsets, it should be understood that the described methods and apparatus are not limited to such systems and that the teachings herein are applicable to other methods and apparatus that include synthesizing audio signals. As used in the following description, audio objects include 3D positional data. Thus, an audio object should be understood to include a particular combined representation of an audio source with 3D positional data, which is typically dynamic in position. In contrast, a "sound source" is an audio signal for playback or reproduction in a final mix or render and it has an intended static or dynamic rendering method or purpose. For example, a source may be the signal "Front Left" or a source may be played to the low frequency effects ("LFE") channel or panned 90 degrees to the right.

Embodiments described herein relate to the processing of audio signals. One embodiment includes a method where at least one set of near-field measurements is used to create an impression of near-field auditory events, where a near-field model is run in parallel with a far-field model. Auditory events that are to be simulated in a spatial region between the regions simulated by the designated near-field and far-field models are created by crossfading between the two models.

The method and apparatus described herein make use of multiple sets of head related transfer functions (HRTFs) that have been synthesized or measured at various distances from a reference head, spanning from the near-field to the boundary of the far-field. Additional synthetic or measured transfer functions maybe used to extend to the interior of the head, i.e., for distances closer than near-field. In addition, the relative distance-related gains of each set of HRTFs are normalized to the far-field HRTF gains.

FIGS. 1A-1C are schematic diagrams of near-field and far-field rendering for an example audio source location. FIG. 1A is a basic example of locating an audio Object in a sound space relative to a listener, including near-field and far-field regions. FIG. 1A presents an example using two radii, however the sound space may be represented using more than two radii as shown in FIG. 1C. In particular, FIG. 1C shows an example of an extension of FIG. 1A using any number of radii of significance. FIG. 1B shows an example spherical extension of FIG. 1A using a spherical representation 21. In particular, FIG. 1B shows that object 22 may have an associated height 23, and associated projection 25 onto a ground plane, an associated elevation 27, and an associated azimuth 29. In such a case, any appropriate number of HRTFs can be sampled on a full 3D sphere of radius Rn. The sampling in each common-radius HRTF set need not be the same.

As shown in FIGS. 1A-1B, Circle R1 represents a far-field distance from the listener and Circle R2 represents a near-field distance from the listener. As shown in FIG. 1C, the Object may be located in a far-field position, a near-field position, somewhere in between, interior to the near-field or beyond the far-field. A plurality of HRTFs ($H_{xy}$) are shown to relate to positions on rings R1 and R2 that are centered on an origin, where x represents the ring number and y represents the position on the ring. Such positionally-related HRTFs will be referred to as a "common-radius HRTF Set." Four location weights are shown in the figure's far-field set and two in the near field set using the convention $W_{xy}$, where x represents a ring number and y represents a position on the ring. Indicators $W_{R1}$ and $W_{R2}$ represent radial weights that can be used to decompose the Object into a weighted combination of the common-radius HRTF sets.

In the examples shown in FIGS. 1A and 1B, as audio objects pass through the listener's near field, the radial distance to the center of the head is measured. Two measured HRTF data sets that bound this radial distance are identified. For each set, the appropriate HRTF pair (ipsilateral and contralateral) is derived based on the desired azimuth and elevation of the sound source location. A final combined HRTF pair is then created by interpolating the frequency responses of each new HRTF pair. This interpolation would likely be based on the relative distance of the sound source to be rendered and the actual measured distance of each HRTF set. The sound source to be rendered is then filtered by the derived HRTF pair and the gain of the resulting signal is increased or decreased based on the distance to the listener's head. This gain can be limited to avoid saturation as the sound source gets very close to one of the listener's ears.

Each HRTF set can span a set of measurements or synthetic HRTFs made in the horizontal plane only or can represent a full sphere of HRTF measurements around the listener. Additionally, each HRTF set can have fewer or greater numbers of samples based on radial measured distance.

Figure 2A:
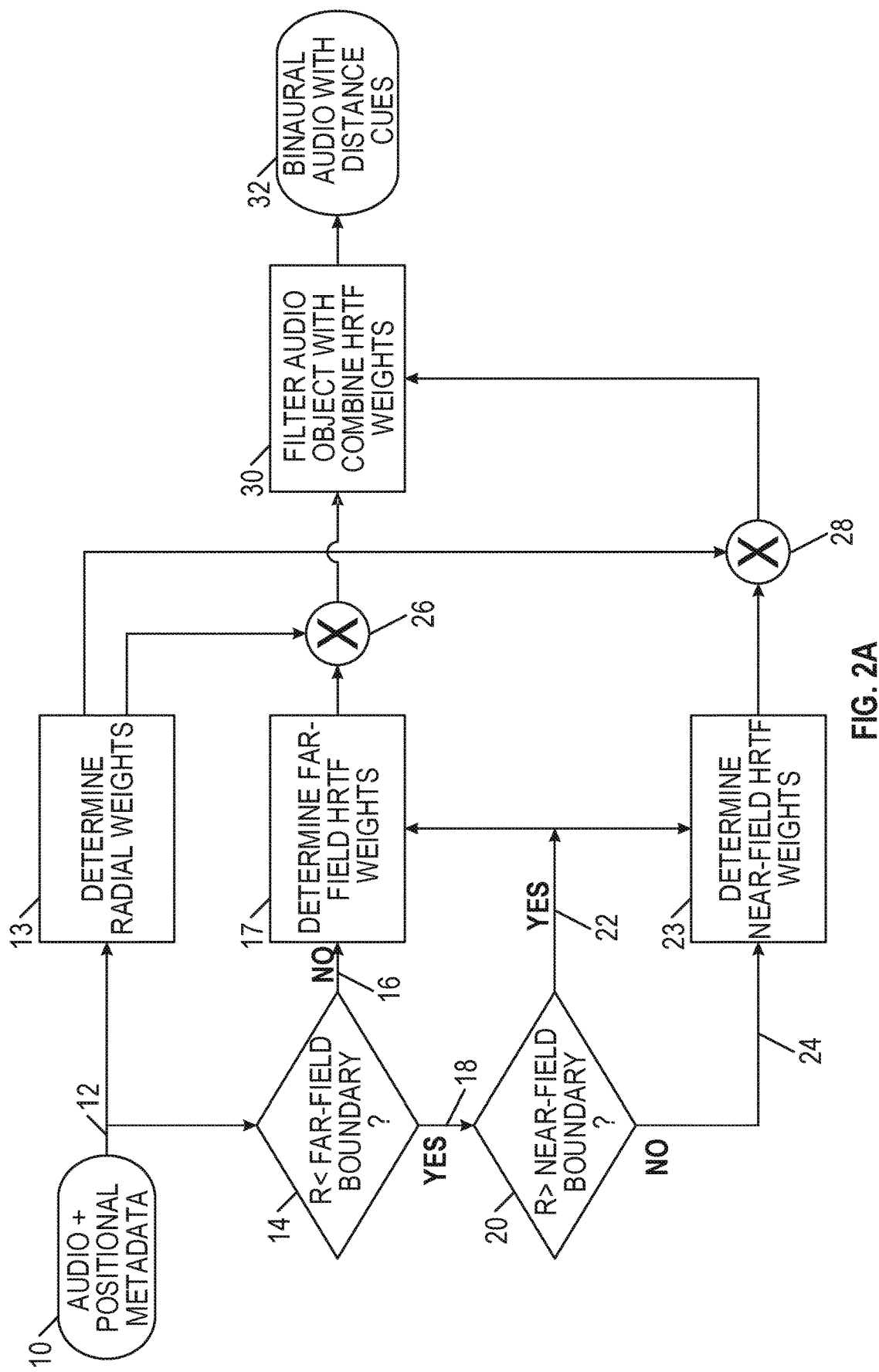
FIGS. 2A-2C are algorithmic flowcharts for generating binaural audio with distance cues.
Figure 2B:
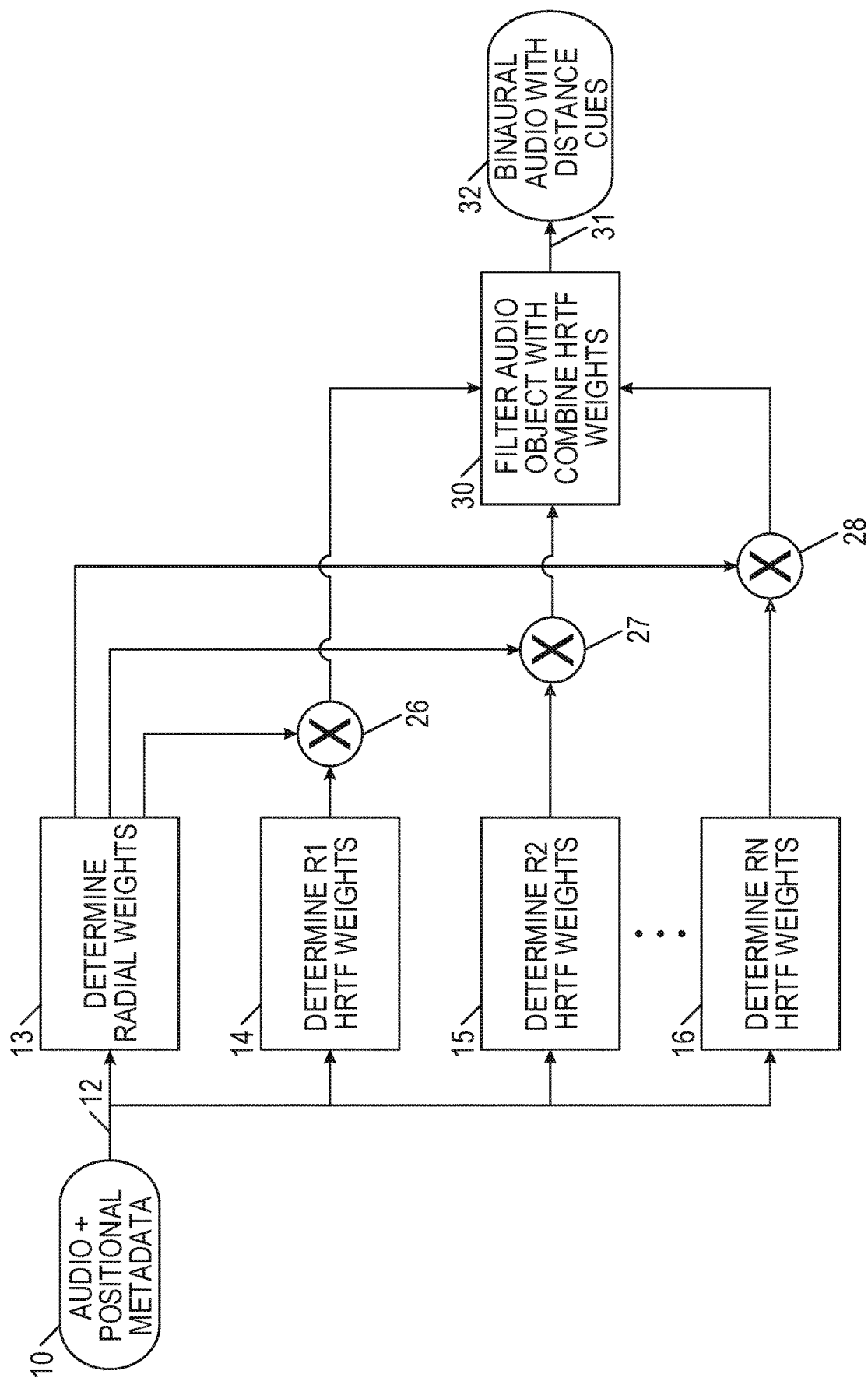
Figure 2C:
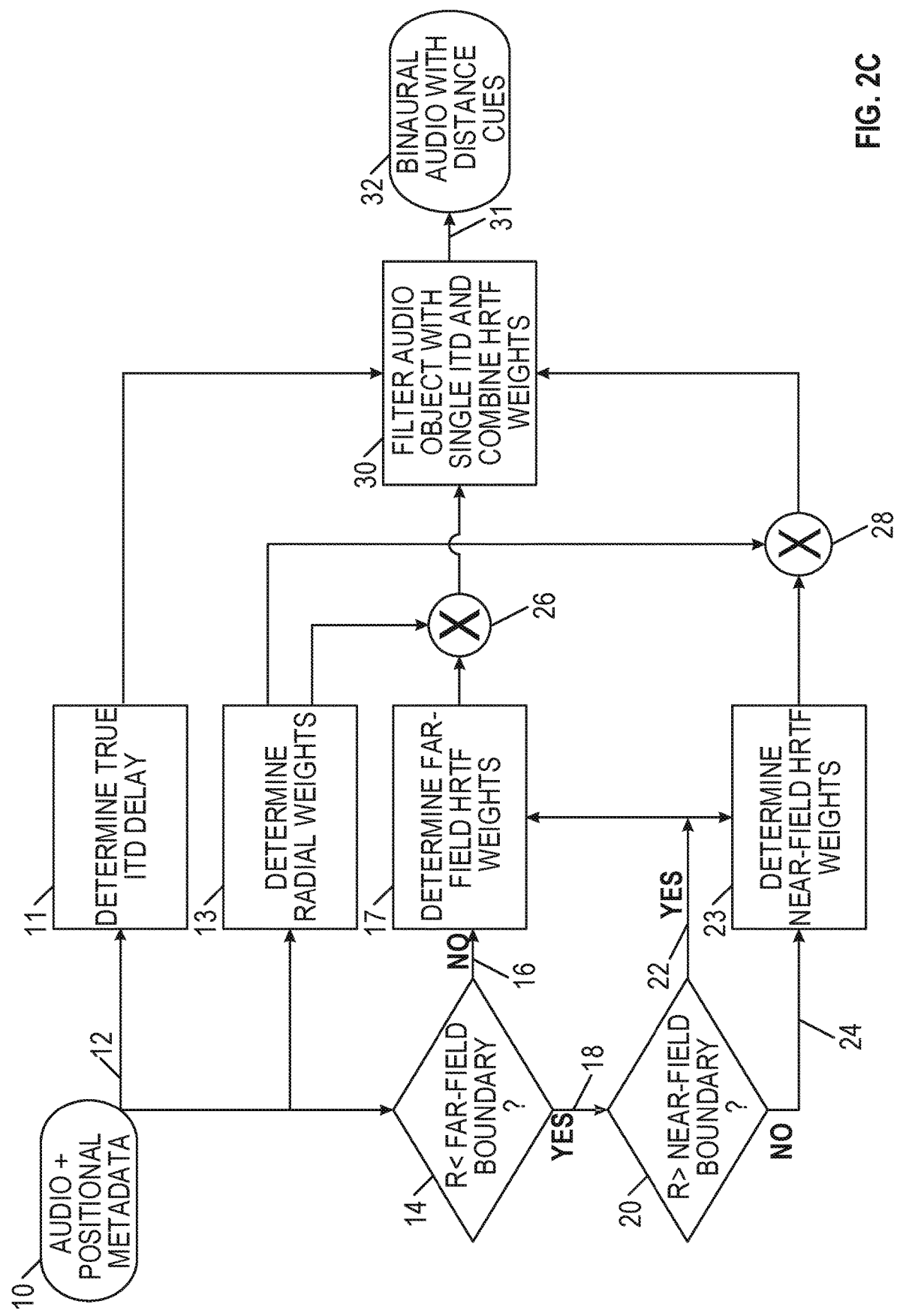

FIGS. 2A-2C are algorithmic flowcharts indicating examples of generating binaural audio with distance cues. FIG. 2A represents a sample flow according to aspects of the present subject matter. Audio and positional metadata 10 of an audio object is input on line 12. This metadata is used to determine radial weights $W_{R1}$ and $W_{R2}$, shown in block 13. In addition, at block 14, the metadata is assessed to determine whether the object is located inside or outside a far-field boundary. If the object is within the far-field region, represented by line 16, then the next step 17 is to determine far-field HRTF weights, such as $W_{11}$ and $W_{12}$ shown in FIG. 1A. If the object is not located within the far-field, as represented by line 18, the metadata is assessed to determine if the object is located within the near-field boundary, as shown by block 20. If the object is located between the near-field and far-field boundaries, as represented by line 22, then the next step is to determine both far-field HRTF weights (block 17) and near-field HRTF weights, such as $W_{21}$ and $W_{22}$ in FIG. 1A (block 23). If the object is located within the near field boundary, as represented by line 24, then the next step is to determine near-field HRTF weights, at block 23. Once the appropriate radial weights, near-field HRTF weights, and far-field HRTF weights have been calculated, they are combined, at 26, 28. Finally, the audio object is then filtered, block 30, with the combined weights to produce binaural audio with distance cues 32. In this manner, the radial weights are used to scale the HRTF weights further from each common-radius HRTF set and create distance gain/attenuation to recreate the sense that an Object is located at the desired position. This same approach can be extended to any radius where values beyond the far-field result in distance attenuation applied by the radial weight. Any radius less than the near field boundary R2, called the "interior," can be recreated by some combination of only the near field set of HRTFs. A single HRTF can be used to represent a location of a monophonic "middle channel" that is perceived to be located between the listener's ears.

Figure 3A:
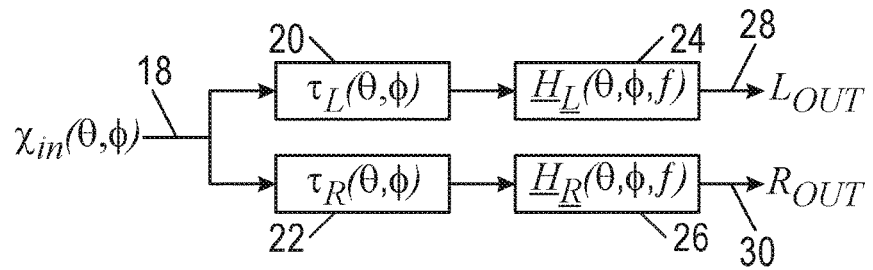
FIG. 3A shows a method of estimating HRTF cues.

FIG. 3A shows a method of estimating HRTF cues. $H_L(\theta, \phi)$ and $H_R(\theta, \phi)$ represent minimum phase head-related impulse responses (HRIRs) measured at the left and right ears for a source at (azimuth=$\theta$, elevation=$\phi$) on a unit sphere (far-field). $\tau_L$ and $\tau_R$ represent time of flight to each ear (usually with excess common delay removed).

Figure 3B:
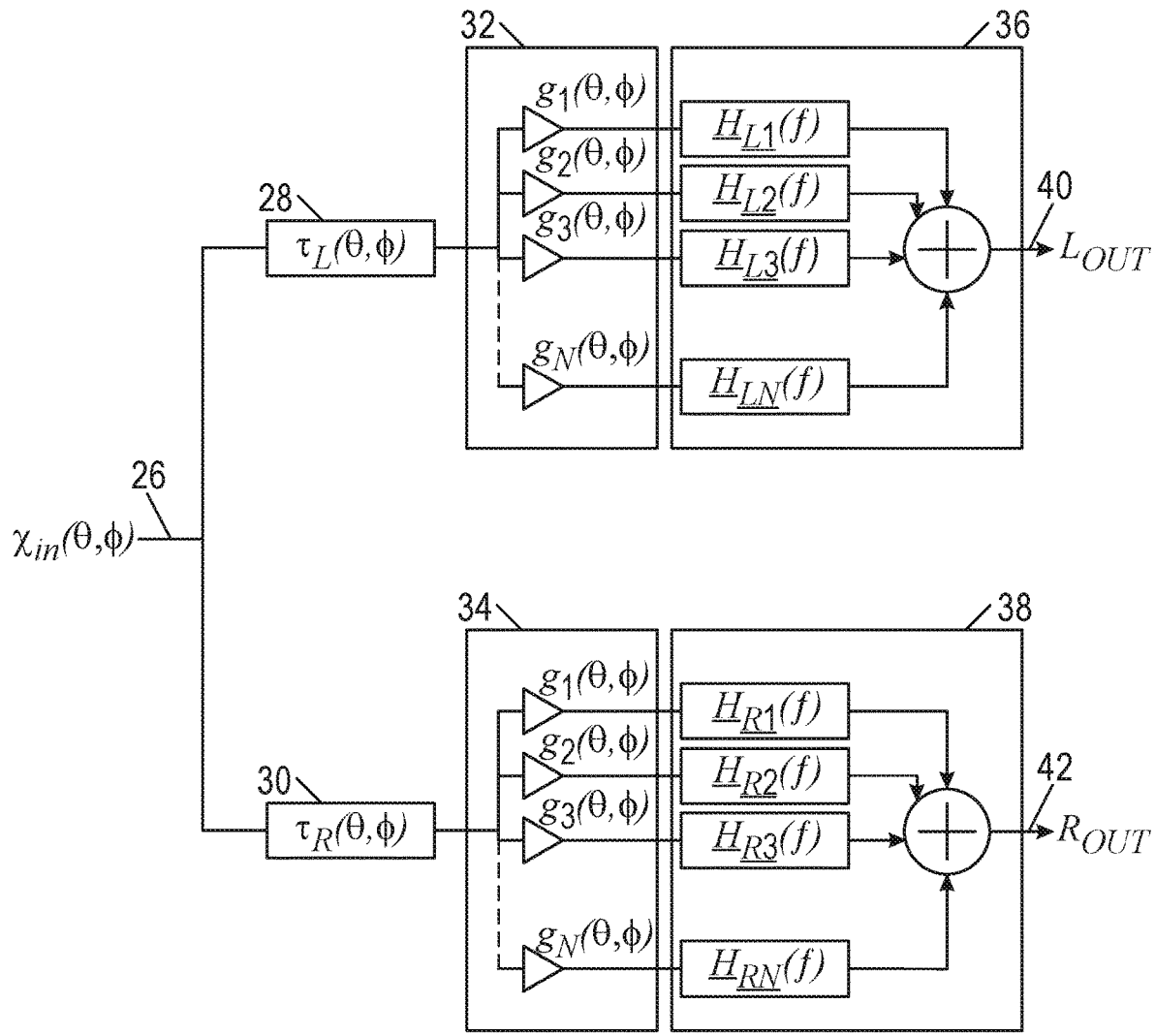
FIG. 3B shows a method of head-related impulse response (HRIR) interpolation.

FIG. 3B shows a method of HRIR interpolation. In this case, there is a database of pre-measured minimum-phase left ear and right ear HRIRs. HRIRs at a given direction are derived by summing a weighted combination of the stored far-field HRIRs. The weighting is determined by an array of gains that are determined as a function of angular position. For example, the gains of four closest sampled HRIRs to the desired position could have positive gains proportional to angular distance to the source, with all other gains set to zero. Alternatively, if the HRIR database is sampled in both azimuth and elevation directions, VBAP/VBIP or similar 3D panner can be used to apply gains to the three closest measured HRIRs.

Figure 3C:
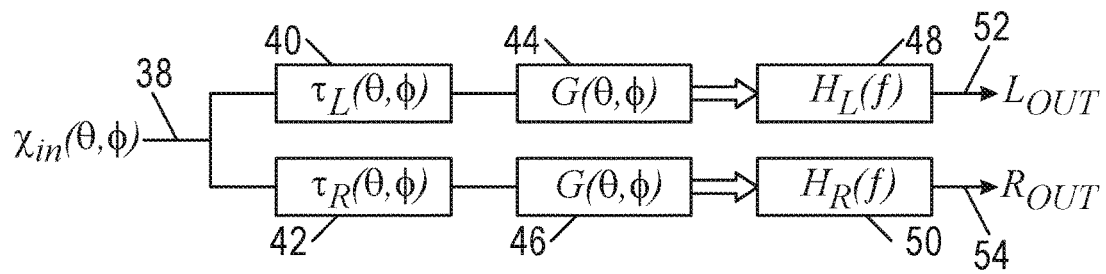
FIG. 3C is a method of HRIR interpolation.

FIG. 3C is a method of HRIR interpolation. FIG. 3C is a simplified version of FIG. 3B. The thick line implies a bus of more than one channels (equal to the number of HRIRs stored in our database). $G(\theta, \phi)$ represents the HRIR weighting gain array and it can be assumed that it is identical for the left and right ears. $H_L(f)$, $H_R(f)$ represent the fixed databases of left and right ear HRIRs.

Still further, a method of deriving a target HRTF pair is to interpolate the two closest HRTFs from each of the closest measurement rings based on known techniques (time or frequency domain) and then further interpolate between those two measurements based on the radial distance to the source. These techniques are described by Equation (1) for an object located at O1 and Equation (2) for an object located at O2. Note that $H_{xy}$ represents an HRTF pair measured at position index x in measured ring y. $H_{xy}$ is a frequency dependent function. $\alpha$, $\beta$, and $\delta$ are all interpolation weighing functions. They may also be a function of frequency.

$$O1 = \delta_{11}(\alpha_{11}H_{11} + \alpha_{12}H_{12}) + \delta_{12}(\beta_{11}H_{21} + \beta_{12}H_{22}) \quad (1)$$

$$O2 = \delta_{21}(\alpha_{21}H_{21} + \alpha_{22}H_{22}) + \delta_{22}(\beta_{21}H_{31} + \beta_{22}H_{32}) \quad (2)$$

In this example, the measured HRTF sets were measured in rings around the listener (azimuth, fixed radius). In other embodiments, the HRTFs may have been measured around a sphere (azimuth and elevation, fixed radius), and the HRTFs could be interpolated between two or more measurements. Radial interpolation would remain the same.

One other element of HRTF modeling relates to the exponential increase in loudness of audio as a sound source gets closer to the head. In general, the loudness of sound will double with every halving of distance to the head. So, for example, sound source at 0.25 m, will be about four times louder than that same sound when measured at 1 m. Similarly, the gain of an HRTF measured at 0.25 m will be four times that of the same HRTF measured at 1 m. In this embodiment, the gains of all HRTF databases are normalized such that the perceived gains do not change with distance. This means that HRTF databases can be stored with maximum bit-resolution. The distance-related gains can then also be applied to the derived near-field HRTF approximation at rendering time. This allows the implementer to use whatever distance model they wish. For example, the HRTF gain can be limited to some maximum as it gets closer to the head, which may reduce or prevent signal gains from becoming too distorted or dominating the limiter.

FIG. 2B represents an expanded algorithm that includes more than two radial distances from the listener. Optionally in this configuration, HRTF weights can be calculated for each radius of interest, but some weights may be zero for distances that are not relevant to the location of the audio object. In some cases, these computations can result in zero weights and may be conditionally omitted, as in the example of FIG. 2A.

FIG. 2C shows a still further example that includes calculating interaural time delay (ITD). In the far-field, it is typical to derive approximate HRTF pairs in positions that were not originally measured by interpolating between the measured HRTFs. This is often done by converting measured pairs of anechoic HRTFs to their minimum phase equivalents and approximating the ITD with a fractional time delay. This works well for the far-field as there is only one set of HRTFs and that set of HRTFs is measured at some fixed distance. In one embodiment, the radial distance of the sound source is determined and the two nearest HRTF measurement sets are identified. If the source is beyond the furthest set, the implementation is the same as would have been done had there only been one far-field measurement set available. Within the near-field, two HRTF pairs are derived from each of two nearest HRTF databases to the sound source to be modeled and these HRTF pairs are further interpolated to derive a target HRTF pair based on the relative distance of the target to the reference measurement distance. The ITD required for the target azimuth and elevation is then derived either from a look up table of ITDs or can be calculated. Note that ITD values may not differ significantly for similar directions in or out of the near-field.

Figure 4:
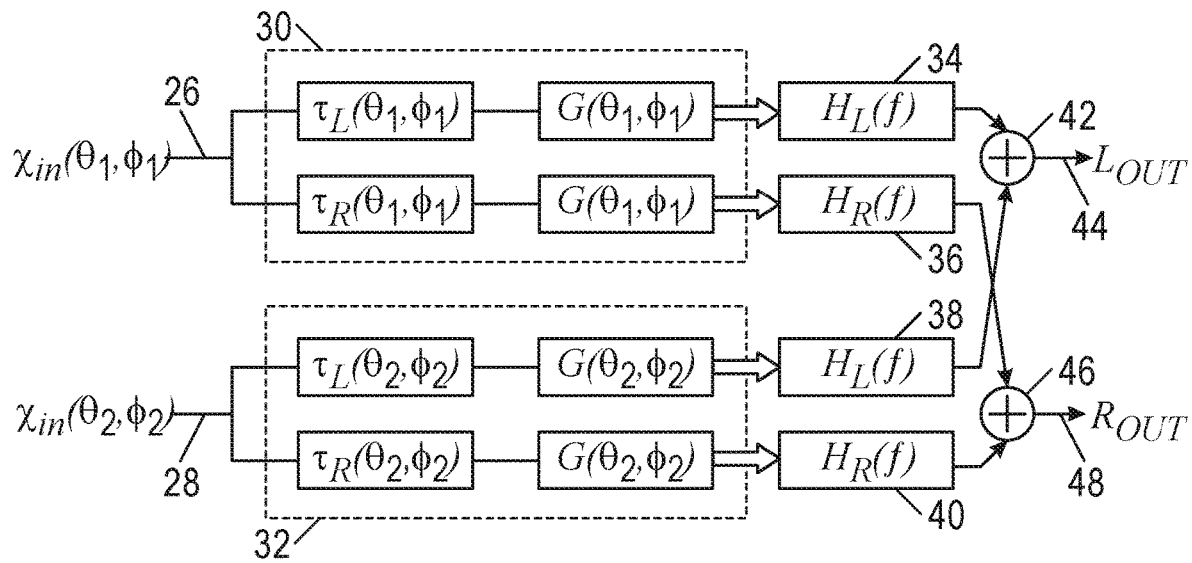
FIG. 4 is a first schematic diagram for two simultaneous sound sources.

FIG. 4 is a first schematic diagram for two simultaneous sound sources. Using this scheme, the sections within the dotted lines can be a function of angular distance while the HRIRs remain fixed. The same left and right ear HRIR databases are implemented twice in this configuration. Again, the bold arrows represent a bus of signals equal to the number of HRIRs in the database.

Figure 5:
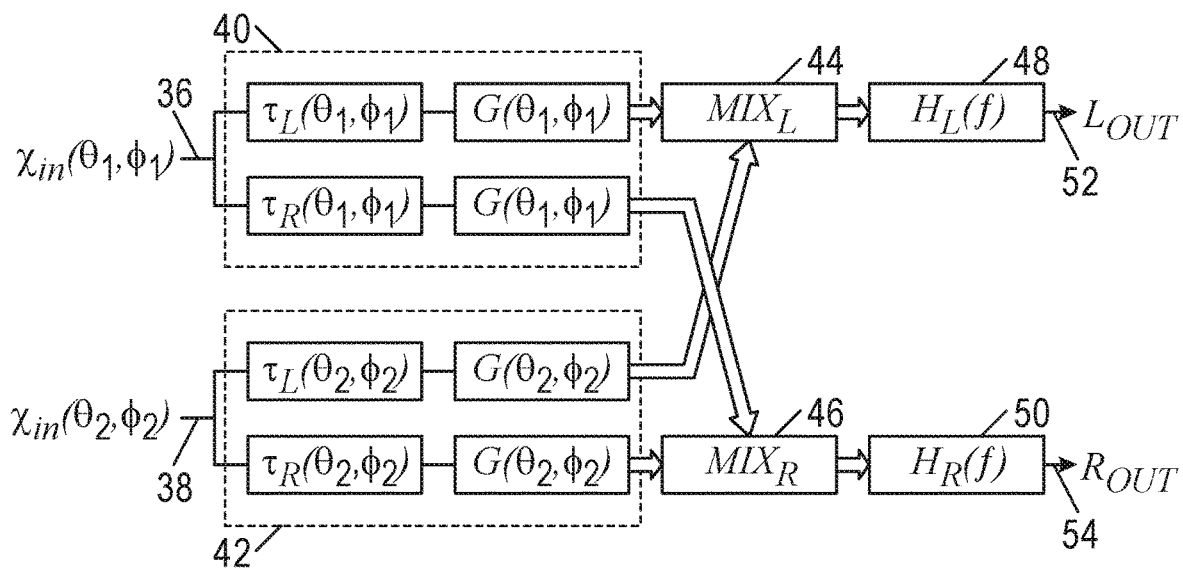
FIG. 5 is a second schematic diagram for two simultaneous sound sources.

FIG. 5 is a second schematic diagram for two simultaneous sound sources. FIG. 5 shows that it is not necessary to interpolate HRIRs for each new 3D source. For a linear, time invariant system, its output can be mixed ahead of the fixed filter blocks. That is, the fixed filter overhead can be consolidated and incurred once, regardless of a number of 3D sources used.

Figure 6:
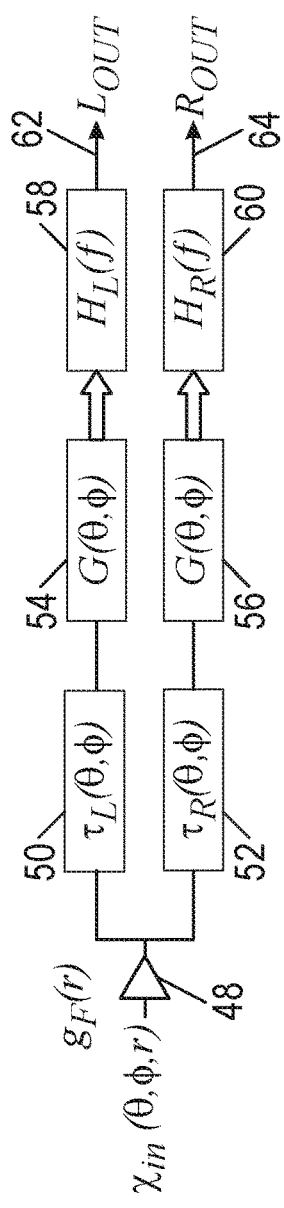
FIG. 6 is a schematic diagram for a 3D sound source that source that is a function of azimuth, elevation, and radius ($\theta$, $\phi$, r).

FIG. 6 is a schematic diagram for a 3D sound source that is a function of azimuth, elevation, and radius ($\theta$, $\phi$, r). In this example, the input is scaled according to a radial distance to the source and can be based on a standard distance roll-off curve. One problem with this approach is that while this kind of frequency-independent distance scaling works in the far-field, it may not work as well in the near field (e.g., r<1) as a frequency response of the HRIRs can vary as a source approaches the head for a fixed (θ, φ).

Figure 7:
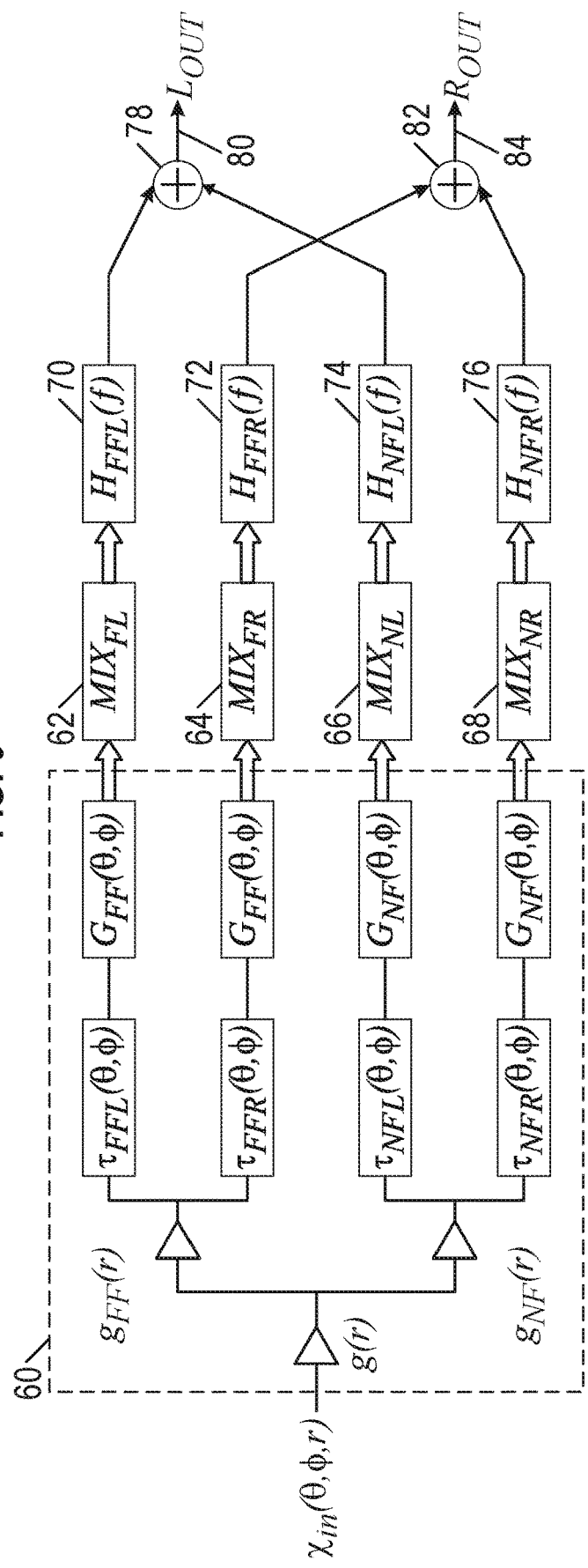
FIG. 7 is a first schematic diagram for applying near-field and far-field rendering to a 3D sound source.

FIG. 7 is a first schematic diagram for applying near-field and far-field rendering to a 3D sound source. In FIG. 7, it is assumed that there is a single 3D source that is represented as a function of azimuth, elevation, and radius. One technique implements a single distance. According to various aspects of the present subject matter, two separate far-field and near-field HRIR databases are sampled. Then crossfading is applied between these two databases as a function of radial distance, r<1. The near-field HRIRS are gain normalized to the far-field HRIRS to reduce frequency independent distance gains seen in the measurement. These gains are reinserted at the input based on a distance roll-off function defined by g(r) when r<L in an example, $g_{FF}(r)=1$ and $g_{NF}(r)=0$ when r>1, and $g_{FF}(r)$ and $g_{NF}(r)$ are functions of distance when r<1, e.g., $g_{FF}(r)=a$, $g_{NF}(r)=1-a$.

Figure 8:
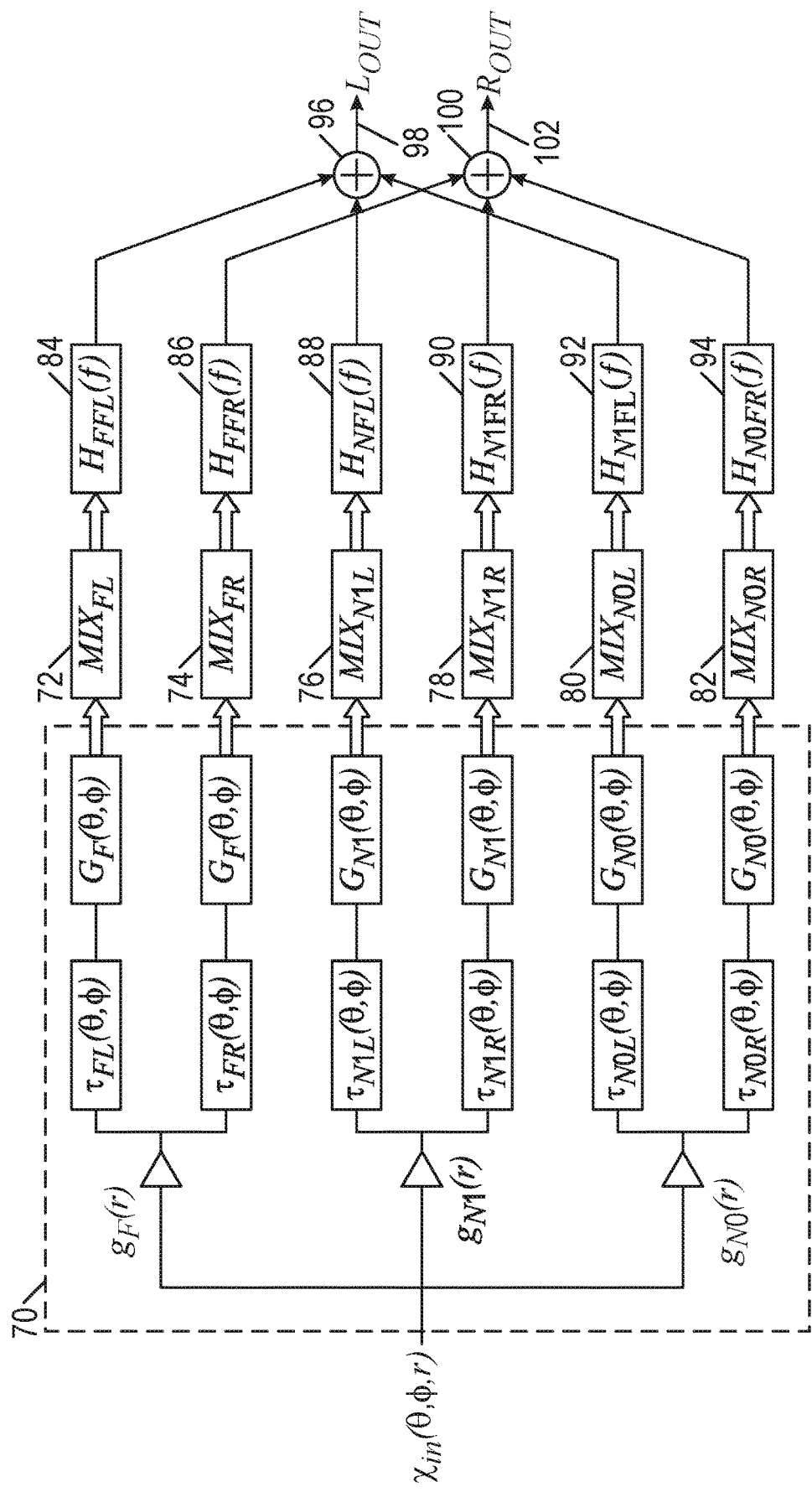
FIG. 8 is a second schematic diagram for applying near-field and far-field rendering to a 3D sound source.

FIG. 8 is a second schematic diagram for applying near-field and far-field rendering to a 3D sound source. FIG. 8 is similar to FIG. 7, but with two sets of near-field HRIRs measured at different distances from the head. This example can provide better sampling coverage of near-field HRIR changes with radial distance.

Figure 9:
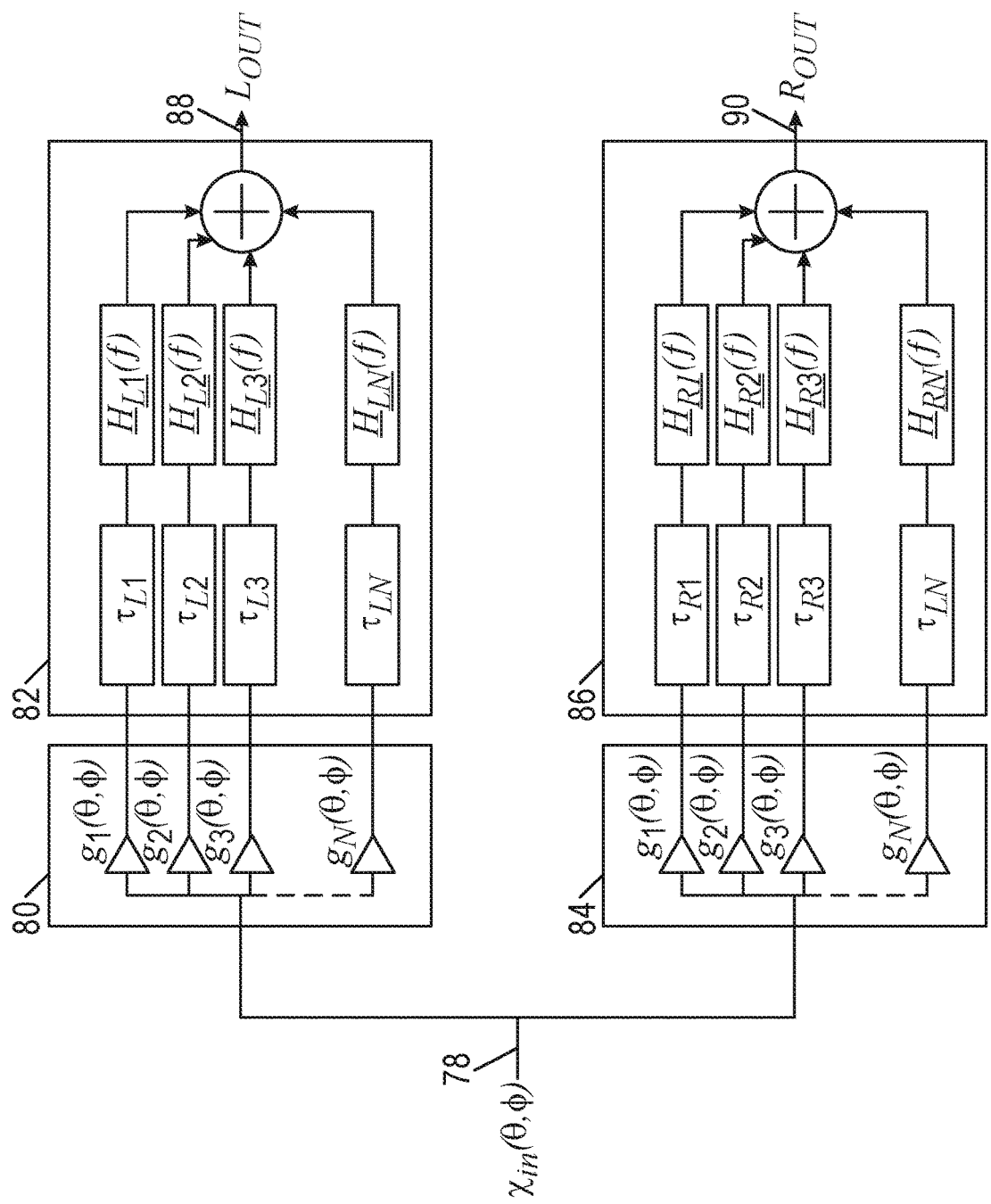
FIG. 9 shows a first time delay filter method of HRIR interpolation.

FIG. 9 shows a first time delay filter method of HRIR interpolation. In an example, FIG. 9 can be an alternative to FIG. 3B. In contrast with FIG. 3B, FIG. 9 provides that HRIR time delays are stored as part of the fixed filter structure. In the example of FIG. 9, ITDs are interpolated with the HRIRs based on the derived gains. The ITD is not updated based on 3D source angle. In this example, the same gain network (e.g., denoted in FIG. 9 by block 80) is applied twice.

Figure 10:
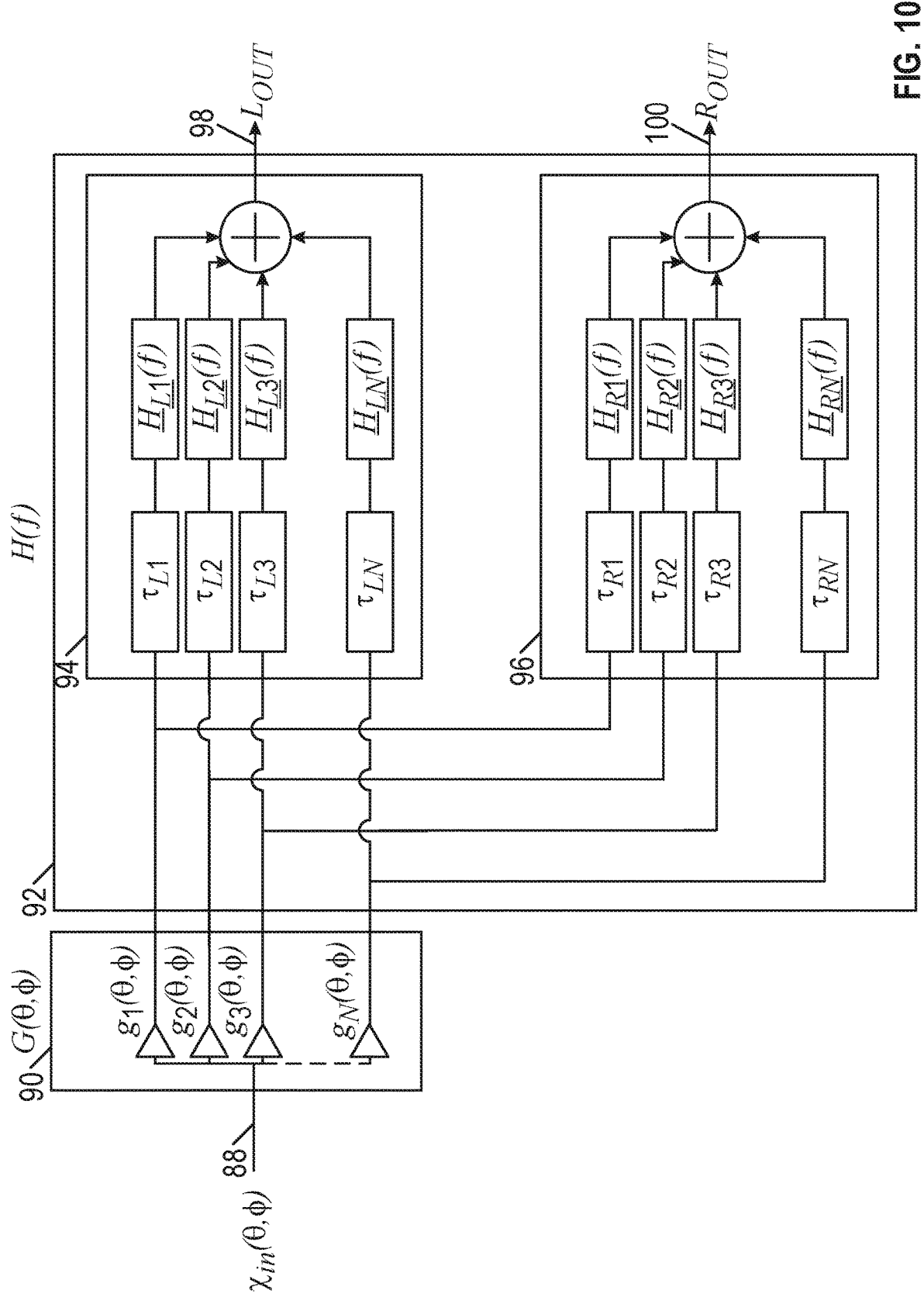
FIG. 10 shows a second time delay filter method of HRIR interpolation.

FIG. 10 shows a second time delay filter method of FIRM interpolation. FIG. 10 overcomes the double application of gain in FIG. 9 by applying one set of gains via a network block 90, such as for both ears using function G(θ, φ) and a single, larger filter structure H(f). One advantage of the configuration shown in the example of FIG. 10 is that it uses half the number of gains and corresponding number of channels, but this advantage can come at the expense of HRIR interpolation accuracy.

Figure 11:
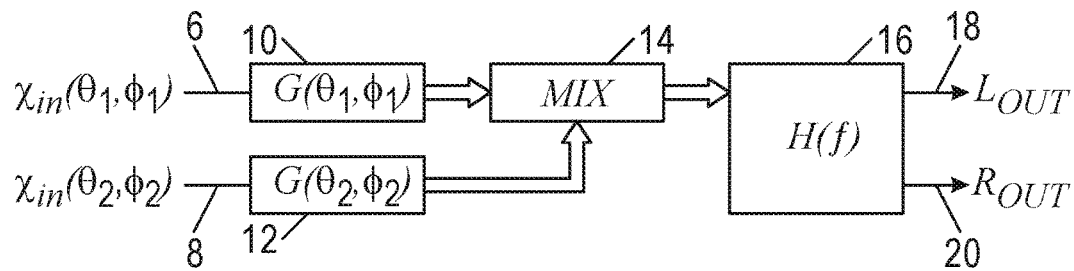
FIG. 11 shows a simplified second time delay filter method of HRIR interpolation.

FIG. 11 shows a simplified second time delay filter method of HRIR interpolation. FIG. 11 is a simplified depiction of FIG. 10 with two different 3D sources, similar to the example of FIG. 5.

Figure 12:
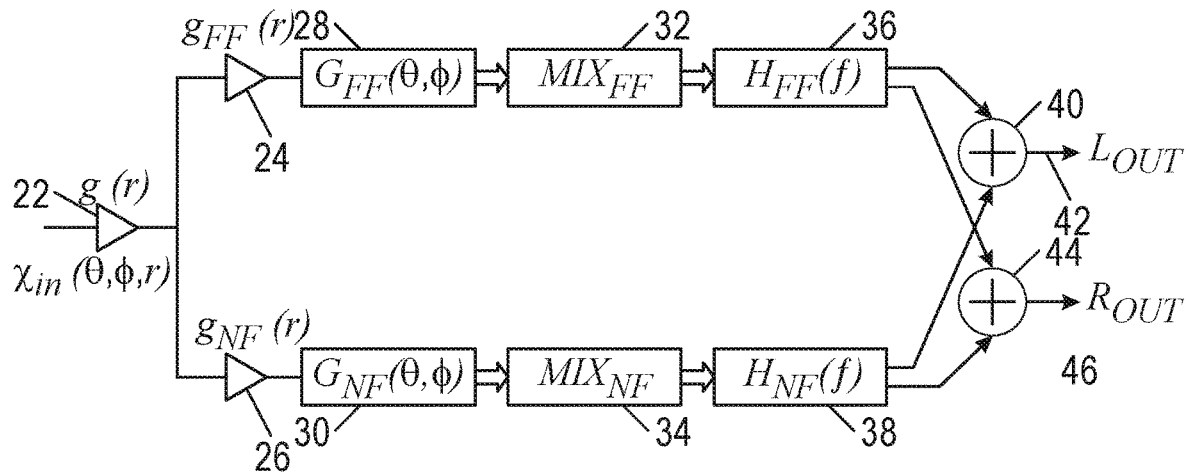
FIG. 12 shows a simplified near-field rendering structure.

FIG. 12 shows a simplified near-field rendering structure. FIG. 12 implements near-field rendering using a more simplified structure (for one source). This configuration is similar to the example of FIG. 7, but with a simpler implementation.

Figure 13:
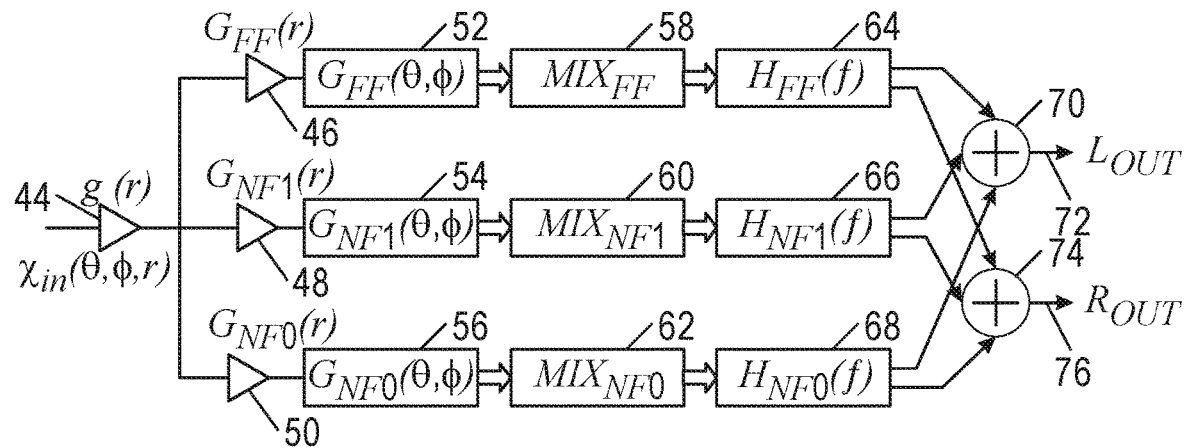
FIG. 13 shows a simplified two-source near-field rendering structure.

FIG. 13 shows a simplified two-source near-field rendering structure. FIG. 13 is similar to FIG. 12, but includes two sets of near-field HRIR databases.

The previous embodiments assume that a different near-field HRTF pair is calculated with each source position update and for each 3D sound source. As such, the processing requirements will scale linearly with the number of 3D sources to be rendered. This is generally an undesirable feature as the processer being used to implement the 3D audio rendering solution may go beyond its allotted resources quite quickly and in a non-deterministic manner (perhaps dependent on the content to be rendered at any given time). For example, the audio processing budget of many game engines might be a maximum of 3% of the CPU.

FIG. 21 is a functional block diagram of a portion of an audio rendering apparatus. In contrast to a variable filtering overhead, it can be desirable to have a fixed and predictable filtering overhead, with a lesser per-source overhead. This can allow a larger number of sound sources to be rendered for a given resource budget and in a more deterministic manner.

FIG. 21 illustrates an HRTF implementation using a fixed filter network 60, a mixer 62 and an additional network 64 of per-object gains and delays. In this embodiment, the network of per-object delays includes three gain/delay modules 66, 68, and 70, having inputs 72, 74, and 76, respectively.

Figure 22:
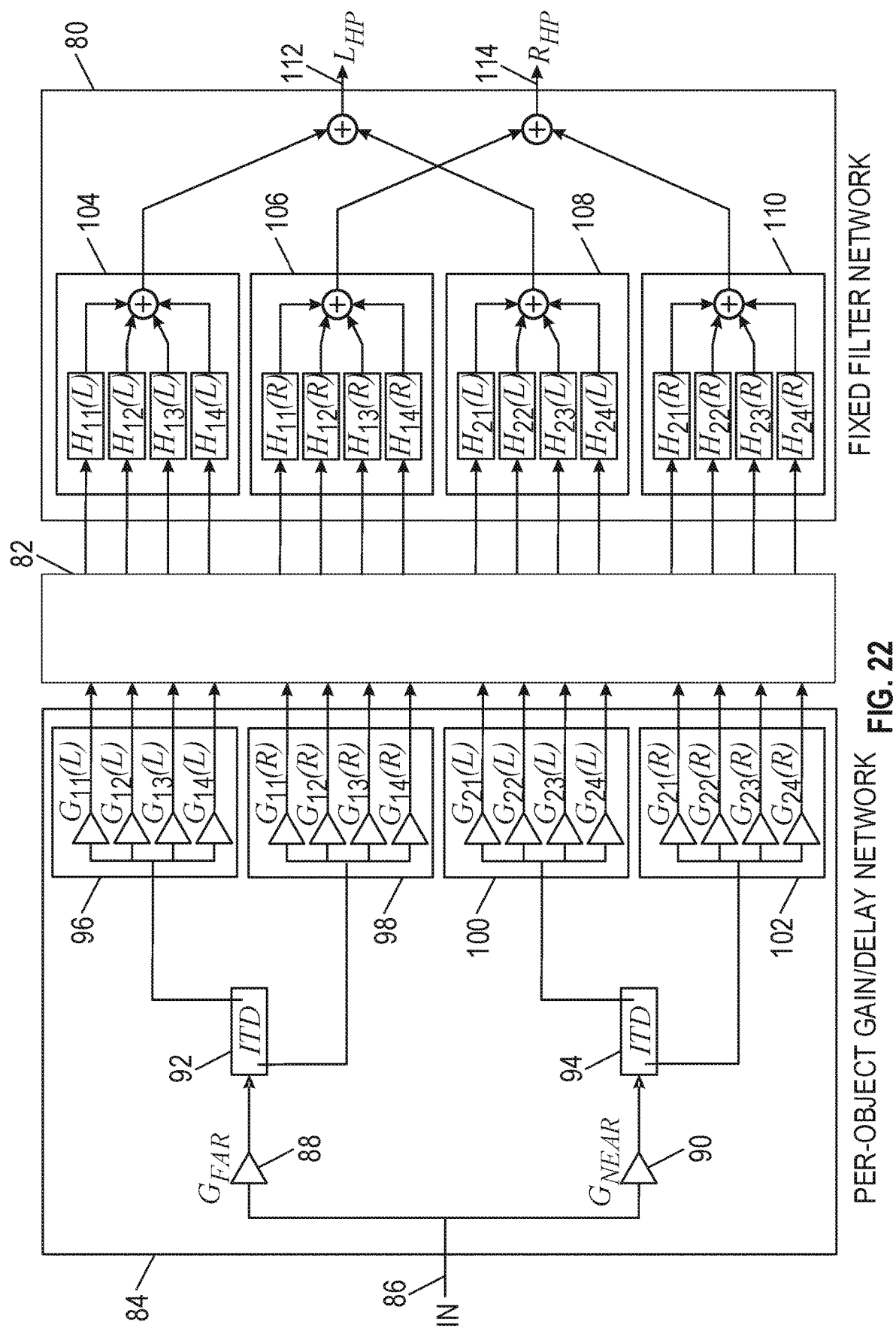
FIG. 22 is a schematic block diagram of a portion of an audio rendering apparatus.

FIG. 22 is a schematic block diagram of a portion of an audio rendering apparatus. In particular, FIG. 22 illustrates an embodiment using the basic topology outlined in FIG. 21, including a fixed audio filter network 80, a mixer 82, and a per-object gain delay network 84. In this example, a per-source ITD model allows for more accurate delay controls per object, as described in the FIG. 2C flow diagram. A sound source is applied to input 86 of the per-object gain delay network 84, which is partitioned between near-field HRTFs and the far-field HRTFs by applying a pair of energy-preserving gains or weights 88, 90, that are derived based on the distance of the sound relative to the radial distance of each measured set. Interaural time delays (ITDs) 92, 94 are applied to delay the left signal with respect to the right signal. The signal levels are further adjusted in block 96, 98, 100, and 102.

This embodiment uses a single 3D audio object, a far-field HRTF set representing four locations greater than about 1 meter away and a near-field HRTF set representing four locations closer than about 1 meter. It is assumed that any distance-based gains or filtering have already been applied to the audio object upstream of the input of this system. In this embodiment, $G_{NEAR}=0$ for all sources that are located in the far-field.

The left-ear and right-ear signals are delayed relative to each other to mimic the ITDs for both the near-field and far-field signal contributions. Each signal contribution for the left and right ears, and the near- and far-fields are weighed by a matrix of four gains whose values are determined by the location of the audio object relative to the sampled HRTF positions. The HRTFs 104, 106, 108, and 110 are stored with interaural delays removed such as in a minimum phase filter network. The contributions of each filter bank are summed to the left 112 or right 114 output and sent to headphones for binaural listening.

For implementations that are constrained by memory or channel bandwidth, it is possible to implement a system that provided similar sounding results but without the need to implement ITDs on a per-source basis.

Figure 23:
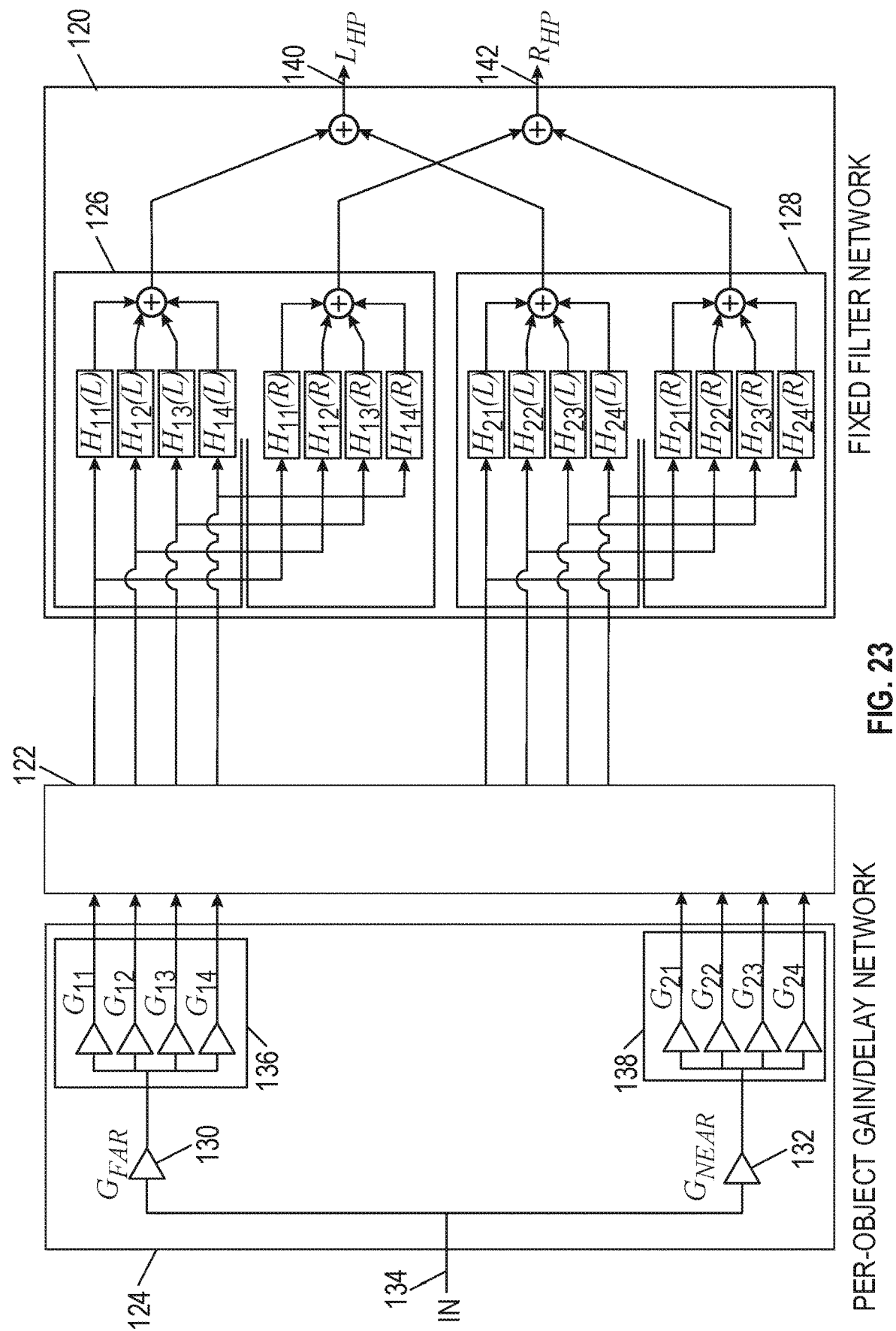
FIG. 23 is a schematic diagram of near-field and far-field audio source locations.

FIG. 23 is a schematic diagram of near-field and far-field audio source locations. In particular, FIG. 23 illustrates an HRTF implementation using a fixed filter network 120, a mixer 122, and an additional network 124 of per-object gains. Per-source ITD is not applied in this case. Prior to being provided to the mixer 122, the per-object processing applies the HRTF weights per common-radius HRTF sets 136 and 138 and radial weights 130, 132.

In the case shown in FIG. 23, the fixed filter network implements a set of HRTFs 126, 128 where the ITDs of the original HRTF pairs are retained. As a result, the implementation only requires a single set of gains 136, 138 for the near-field and far-field signal paths. A sound source is applied to input 134 of the per-object gain delay network 124 is partitioned between near-field HRTFs and the far-field HRTFs by applying a pair of energy or amplitude-preserving gains 130, 132, that are derived based on the distance of the sound relative to the radial distance of each measured set.

The signal levels are further adjusted in block 136 and 138. The contributions of each filter bank are summed to the left 140 or right 142 output and sent to headphones for binaural listening.

This implementation has the disadvantage that the spatial resolution of the rendered object will be less focused because of interpolation between two or more contralateral HRTFs who each have different time delays. The audibility of the associated artifacts can be minimized with a sufficiently sampled HRTF network. For sparsely sampled HRTF sets, the comb filtering associated with contralateral filter summation may be audible, especially between sampled HRTF locations.

The described embodiments include at least one set of far-field HRTFs that are sampled with sufficient spatial resolution so as to provide a valid interactive 3D audio experience and a pair of near-field HRTFs sampled close to the left and right ears. Although the near-field HRTF dataspace is sparsely sampled in this case, the effect can still be very convincing. In a further simplification, a single near-field or "middle" HRTF could be used. In such minimal cases, directionality is only possible when the far-field set is active.

Figure 24:
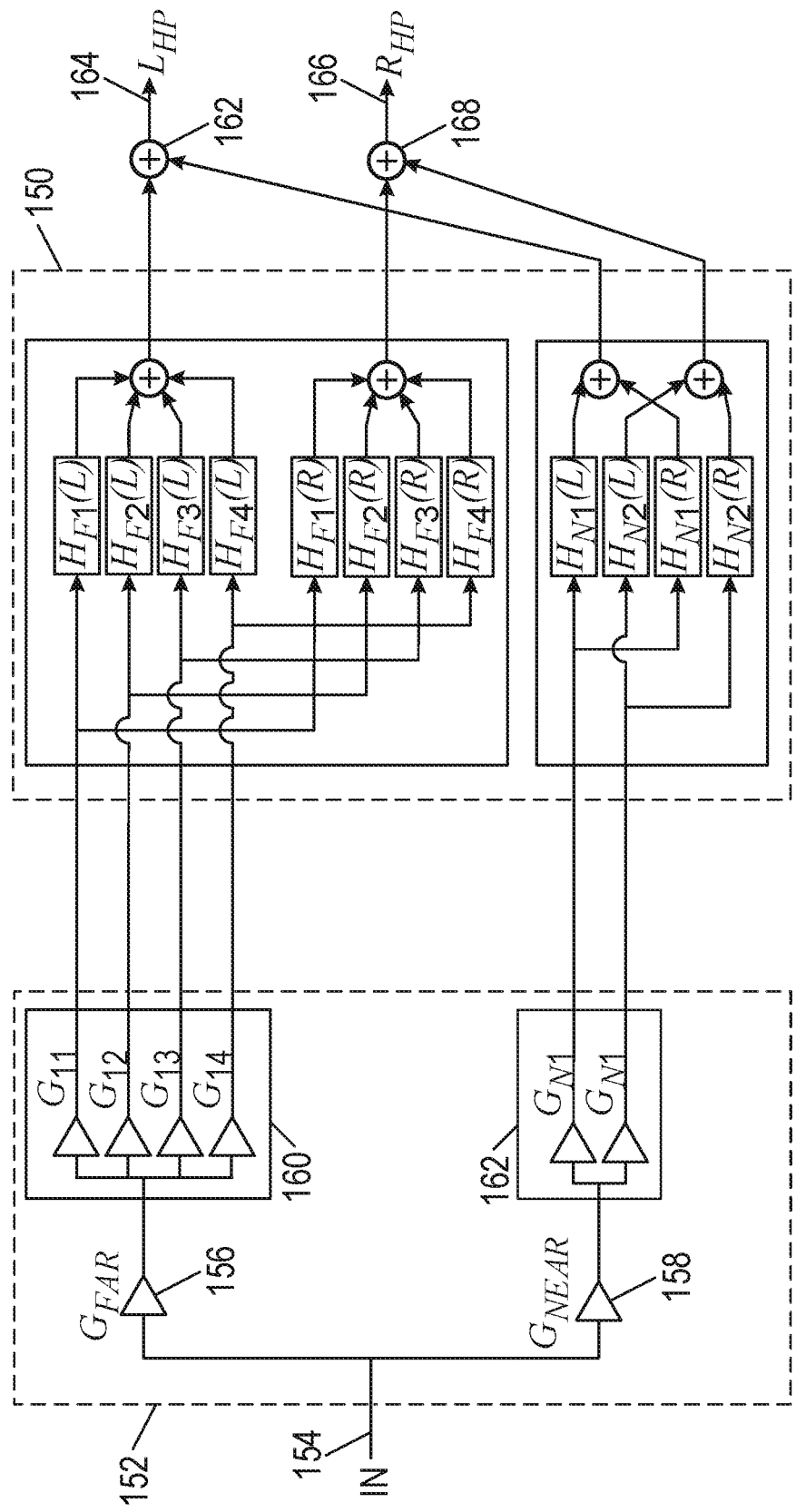
FIG. 24 is a functional block diagram of a portion of an audio rendering apparatus.

FIG. 24 is a functional block diagram of a portion of an audio rendering apparatus. In an example, FIG. 24 represents a simplified implementation of various examples discussed above. Practical implementations would likely have a larger set of sampled far-field HRTF positions that are also sampled around a three-dimensional listening space. Moreover, in various embodiments, the outputs may be subjected to additional processing steps such as cross-talk cancellation to create transaural signals suitable for speaker reproduction. Similarly, it is noted that the distance panning across common-radius sets may be used to create the submix (e.g., mixing block 122 in FIG. 23) such that it is suitable for storage/transmission/transcoding or other delayed rendering on other suitably configured networks.

The above description describes methods and apparatus for near-field rendering of an audio object in a sound space. The ability to render an audio object in both the near-field and far-field enables the ability to fully render depth of not just objects, but any spatial audio mix decoded with active steering/panning, such as Ambisonics, matrix encoding, etc., thereby enabling full translational head tracking (e.g., user movement) beyond simple rotation in the horizontal plane, or 6-degrees-of-freedom (6-DOF) tracking and rendering. Methods and apparatus will now be described for attaching depth information to, by example, Ambisonic mixes, created either by capture or by Ambisonic panning. The techniques described herein generally use first order Ambisonics as an example, but the techniques can be applied to third or higher order Ambisonics as well.

Ambisonic Basics

Where a multichannel mix would capture sound as a contribution from multiple incoming signals, Ambisonics provides for capturing or encoding a fixed set of signals that represent the direction of all sounds in the soundfield from a single point. In other words, the same ambisonic signal could be used to re-render the soundfield on any number of loudspeakers. In a multichannel case, one can be limited to reproducing sources that originated from combinations of the channels. For example, if there are no height channels, then no height information is transmitted. In Ambisonics, on the other hand, information about a full directional picture can be captured and transmitted, and limitations are generally only imposed at the point of reproduction.

Consider the set of 1st order (e.g., B-Format) panning equations, which can largely be considered virtual microphones at a point of interest:

$W = S*1/\sqrt{2}$, where $W$=omni component;

$X = S*\cos(\theta)*\cos(\phi)$, where $X$=figure 8 pointed front;

$Y = S*\sin(\theta)*\cos(\phi)$, where $Y$=figure 8 pointed right;

$Z = S*\sin(\phi)$, where $Z$=figure 8 pointed up;

and S is a signal to be panned.

From these four signals (W, X, Y, and Z), a virtual microphone pointed in any direction can be created. As such, a decoder receiving the signals is largely responsible for recreating a virtual microphone pointed to each of the speakers being used to render. This technique works to a large degree, but in some cases it is only as good as using real microphones to capture the response. As a result, while the decoded signal may have the desired signal for each output channel, each channel will also have a certain amount of leakage or "bleed" included, so there is some art to designing a decoder which best represents a decoder layout, especially if it has non-uniform spacing. This is why many ambisonic reproduction systems use symmetric layouts (quadrilaterals, hexagons, etc.).

Headtracking is naturally supported by these kinds of solutions because the decoding is achieved by a combined weight of the WXYZ directional steering signals. To rotate a B-Format mix, for example, a rotation matrix may be applied with the WXYZ signals prior to decoding and the results will decode to the properly adjusted directions. However, such a solution may not be capable of implementing a translation (e.g., user movement or change in listener position).

Active Decode Extension

It is desirable to combat leakage and improve the performance of non-uniform layouts. Active decoding solutions such as Harpex or DirAC do not form virtual microphones for decoding. Instead, they inspect the direction of the soundfield, recreate a signal, and specifically render it in the direction they have identified for each time-frequency. While this greatly improves the directivity of the decoding, it limits the directionality because each time-frequency tile uses a hard decision. In the case of DirAC, it makes a single direction assumption per time-frequency. In the case of Harpex, two directional wavefronts can be detected. In either system, the decoder may offer a control over how soft or how hard the directionality decisions should be. Such a control is referred to herein as a parameter of "Focus," which can be a useful metadata parameter to allow soft focus, inner panning, or other methods of softening the assertion of directionality.

Even in the active decoder cases, distance is a key missing function. While direction is directly encoded in the ambisonic panning equations, no information about the source distance can be directly encoded beyond simple changes to level or reverberation ratio based on source distance. In Ambisonic capture/decode scenarios, there can and should be spectral compensation for microphone "closeness" or "microphone proximity," but this does not allow actively decoding one source at 2 meters, for example, and another at 4 meters. That is because the signals are limited to carrying only directional information. In fact, passive decoder performance relies on the fact that the leakage will be less of an issue if a listener is perfectly situated in the sweetspot and all channels are equidistant. These conditions maximize the recreation of the intended soundfield.

Moreover, the headtracking solution of rotations in the B-Format WXYZ signals would not allow for transformation matrices with translation. While the coordinates could allow a projection vector (e.g., homogeneous coordinate), it is difficult or impossible to re-encode after the operation (that would result in the modification being lost), and difficult or impossible to render it. It would be desirable to overcome these limitations.

Headtracking with Translation

FIG. 14 is a functional block diagram of an active decoder with headtracking. As discussed above, there are no depth considerations encoded in the B-Format signal directly. On decode, the renderer will assume this soundfield represents the directions of sources that are part of the soundfield rendered at the distance of the loudspeaker. However, by making use of active steering, the ability to render a formed signal to a particular direction is only limited by the choice of panner. Functionally, this is represented by FIG. 14, which shows an active decoder with headtracking.

If the selected panner is a "distance panner" using the near-field rendering techniques described above, then as a listener moves, the source positions (in this case the result of the spatial analysis per bin-group) can be modified by a homogeneous coordinate transform matrix which includes the needed rotations and translations to fully render each signal in full 3D space with absolute coordinates. For example, the active decoder shown in FIG. 14 receives an input signal 28 and converts the signal to the time domain using an FFT 30. The converted signal can be processed using spatial analysis 32, such as using a time domain signal to determine the relative location of one or more signals. For example, spatial analysis 32 may determine that a first sound source is positioned in front of a user (e.g., 0° azimuth) and a second sound source is positioned to the right (e.g., 90° azimuth) of the user. In an example, spatial analysis at block 32 (e.g., for any of the examples of FIGS. 14, 15, 16, 17, and 19) can include positioning a virtual source to be rendered at an intended depth relative to a listener position, including when the virtual source is based on information from one or more spatial audio signals and each of the spatial audio signals corresponds to a respective different reference depth relative to a reference position, as discussed elsewhere herein. In an example, a spatial audio signal is or comprises a portion of a submix. Signal forming 34 uses the time domain signal to generate these sources, which are output as sound objects with associated metadata. The active steering 38 may receive inputs from the spatial analysis 32 or the signal forming 34 and rotate (e.g., pan) the signals. In particular, active steering 38 may receive the source outputs from the signal forming 34 and may pan the source based on the outputs of the spatial analysis 32. Active steering 38 may also receive a rotational or translational input from a head tracker 36. Based on the rotational or translational input, the active steeling rotates or translates the sound sources. For example, if the head tracker 36 indicated a 90° counter-clockwise rotation, the first sound source would rotate from the front of the user to the left, and the second sound source would rotate from the right of the user to the front. Once any rotational or translational input is applied in active steering 38, the output is provided to an inverse FFT 40 and used to generate one or more far-field channels 42 or one or more near-field channels 44. The modification of source positions may also include techniques analogous to modification of source positions as used in the field of 3D graphics.

The method of active steering may use a direction (computed from the spatial analysis) and a panning algorithm, such as VBAP. By using a direction and panning algorithm, the computational increase to support translation is primarily in the cost of the change to a 4×4 transform matrix (as opposed to the 3×3 needed for rotation only), distance panning (roughly double the original panning method), and the additional inverse fast Fourier transforms (IFFTs) for the near-field channels. Note that in this case, the 4×4 rotation and panning operations are on the data coordinates, not the signal, meaning it gets computationally less expensive with increased bin grouping. The output mix of FIG. 14 can serve as the input for a similarly configured fixed HRTF filter network with near-field support as discussed above and shown in FIG. 21, thus FIG. 14 can functionally serve as the Gain/Delay Network for an ambisonic Object.

Depth Encoding

Once a decoder supports headtracking with translation and has a reasonably accurate rendering (due to active decoding), it would be desirable to encode depth to a source directly. In other words, it would be desirable to modify the transmission format and panning equations to support adding depth indicators during content production. Unlike typical methods that apply depth cues such as loudness and reverberation changes in the mix, this method would enable recovering the distance of a source in the mix so that it can be rendered for the final playback capabilities rather than those on the production side. Three methods with different trade-offs are discussed herein, where the trade-offs can be made depending on the allowable computational cost, complexity, and requirements such as backwards compatibility.

Depth-Based Submixing (N Mixes)

FIG. 15 is a functional block diagram of an active decoder with depth and headtracking. In an example, FIG. 15 provides a method that supports parallel decoding of "N" independent B-Format mixes, each with an associated metadata (or assumed) depth. In the example of FIG. 15, near and far-field B-Formats are rendered as independent mixes along with an optional "Middle" channel. The near-field Z-channel is also optional, as some implementations may not render near-field height channels. When dropped, the height information is projected in the far/middle field or using the Faux Proximity ("Froximity") methods discussed below for the near-field encoding. The results are the Ambisonic equivalent to the above-described "Distance Panner"/"near-field renderer" in that the various depth mixes (near, far, mid, etc.) maintain separation. However, in the illustrated case, there is a transmission of eight or nine channels total for any decoding configuration, and there is a flexible decoding layout that is fully independent for each depth. Just as with the Distance Panner, this can be generalized to "N" mixes, however, in many cases two mixes can be used (e.g., one mix for far-field and one mix for near-field), and sources further than the far-field can be mixed in the far-field, such as with distance attenuation. Sources interior to the near field can be placed in the near-field mix with or without "Froximity" style modifications or projection such that a source at radius 0 is rendered without direction.

To generalize this process, it would be desirable to associate some metadata with each mix. In an example, each mix can be tagged with: (1) Distance of the mix, and (2) Focus of the mix (e.g., an indication of how sharply the mix should be decoded, for example so that mixes inside the head are not decoded with too much active steering). Other embodiments could use a Wet/Dry mix parameter to indicate which spatial model to use if there is a selection of HRIRs with more or less reflections (or a tunable reflection engine).

Preferably, appropriate assumptions would be made about the layout so no additional metadata is needed to send it as an 8-channel mix, thus making it compatible with existing streams and tools.

'D' Channel (as in WXYZD)

FIG. 16 is a functional block diagram of an alternative active decoder with depth and head tacking with a single steering channel 'D.' FIG. 16 is an alternative method in which the set of possibly redundant signals (WXYZnear) are replaced with one or more depth (or distance) channel 'D'. The depth channels are used to encode time-frequency information about the effective depth of the ambisonic mix, which can be used by the decoder for distance rendering the sound sources at each frequency. The 'D' channel will encode as a normalized distance which can as one example be recovered as value of 0 (being in the head at the origin), 0.25 being exactly in the near-field, and up to 1 for a source rendered fully in the far-field. This encoding can be achieved by using an absolute value reference such as 0dBFS or by relative magnitude and/or phase vs one or more of the other channels such as the "W" channel. Any actual distance attenuation resulting from being beyond the far-field is handled by the B-Format part of the mix as it would in legacy solutions.

By treating distance m this way, the B-Format channels are functionally backwards compatible with normal decoders by dropping the D channel(s), resulting in a distance of 1 or "far-field" being assumed. However, our decoder would be able to make use of these signal(s) to steer in and out of the near-field. Since no external metadata is required, the signal can be compatible with legacy 5.1 audio codecs. As with the "N Mixes" solution, the extra channel(s) are signal rate and defined for all time-frequency. This means that it is also compatible with any bin-grouping or frequency domain tiling as long as it is kept in sync with the B-Format channels. These two compatibility factors make this a particularly scalable solution. One method of encoding the D channel is to use relative magnitude of the W channel at each frequency. If the D channel's magnitude at a particular frequency is exactly the same as the magnitude as the W channel at that frequency, then the effective distance at that frequency is 1 or "far-field." If the D channel's magnitude at a particular frequency is 0, then the effective distance at that frequency is 0, which corresponds to the middle of the listener's head. In another example, if the D channel's magnitude at a particular frequency is 0.25 of the W channel's magnitude at that frequency, then the effective distance is 0.25 or "near-field." The same idea can be used to encode the D channel using relative power of the W channel at each frequency.

Another method of encoding the D channel is to perform directional analysis (spatial analysis) exactly the same as the one used by the decoder to extract the sound source direction(s) associated with each frequency. If there is only one sound source detected at a particular frequency, then the distance associated with the sound source is encoded. If there is more than one sound source detected at a particular frequency, then a weighted average of the distances associated with the sound sources is encoded.

Alternatively, the distance channel can be encoded by performing frequency analysis of each individual sound source at a particular time frame. The distance at each frequency can be encoded either as the distance associated with the most dominant sound source at that frequency or as the weighted average of the distances associated with the active sound sources at that frequency. The above-described techniques can be extended to additional D Channels, such as extending to a total of N channels. In the event that the decoder can support multiple sound source directions at each frequency, additional D channels could be included to support extending Distance in these multiple directions. Care would be needed to ensure the source directions and source distances remain associated by the correct encode/decode order.

Faux Proximity or "Froximity" encoding is an alternative coding system for the addition of the 'D' channel, for example to modify the 'W' channel such that a ratio of signal in W to the signals in XYZ indicates a desired distance. However, this system is not backwards compatible to standard B-Format, as the typical decoder requires fixed ratios of the channels to ensure energy preservation upon decode. This system would require active decoding logic in the "signal forming" section to compensate for these level fluctuations, and the encoder would require directional analysis to pre-compensate the XYZ signals. Further, the system has limitations when steering multiple correlated sources to opposite sides. For example two sources side left/side right, front/back or top/bottom would reduce to 0 on the XYZ encoding. As such, the decoder would be forced to make a "zero direction" assumption for that band and render both sources to the middle. In this case, the separate D channel could have allowed the sources to both be steered to have a distance of 'D'.

To maximize the ability of Proximity rendering to indicate proximity, the preferred encoding would be to increase the W channel energy as the source gets closer. This can be balanced by a complimentary decrease in the XYZ channels. This style of Proximity simultaneously encodes the "proximity" by lowering the "directivity" while increasing the overall normalization energy—resulting in a more "present" source. This could be further enhanced by active decoding methods or dynamic depth enhancement.

FIG. 17 is a functional block diagram of an active decoder with depth and headtracking, with metadata depth only. Alternatively, using fill metadata is an option. In this alternative, the B-Format signal is only augmented with whatever metadata can be sent alongside it. This is shown in FIG. 17. At a minimum, the metadata defines a depth for the overall ambisonic signal (such as to label a mix as being near or far), but it would ideally be sampled at multiple frequency bands to prevent one source from modifying the distance of the whole mix.

In an example, the required metadata includes depth (or radius) and "focus" to render the mix, which are the same parameters as the N Mixes solution above. Preferably, this metadata is dynamic and can change with the content, and is per-frequency or at least in a critical band of grouped values.

In an example, optional parameters may include a Wet/Dry mix, or having more or less early reflections or "Room Sound." This could then be given to the renderer as a control on the early-reflection/reverb mix level. It should be noted that this could be accomplished using near-field or far-field binaural room impulse responses (BRIRs), where the BRIRs are also approximately dry.

Optimal Transmission of Spatial Signals

In the methods above, we described a particular case of extending ambisonic B-Format. For the rest of this document, we will focus on the extension to spatial scene coding in a broader context, but which helps to highlight the key elements of the present subject matter.

Figure 18:
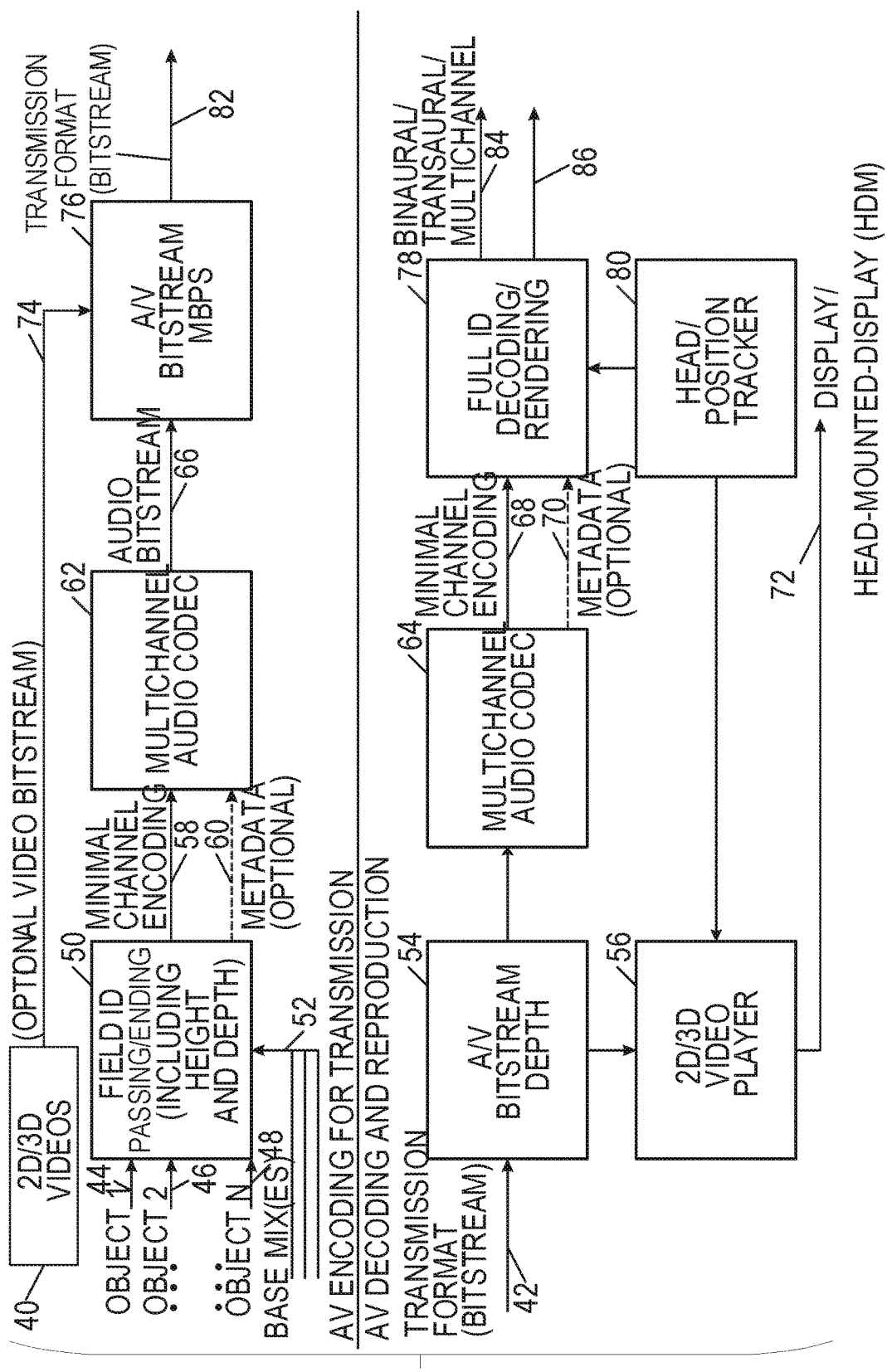
FIG. 18 shows an example optimal transmission scenario for virtual reality applications.

FIG. 18 shows an example optimal transmission scenario for virtual reality applications. It is desirable to identify efficient representations of complex sound scenes that optimize performance of an advanced spatial renderer while keeping the bandwidth of transmission comparably low. In an ideal solution, a complex sound scene (multiple sources, bed mixes, or soundfields with full 3D positioning including height and depth information) can be fully represented with a minimal number of audio channels that remain compatible with standard audio-only codecs. In other words, it would be ideal not to create a new codec or rely on a metadata side-channel, but rather to carry an optimal stream over existing transmission pathways, which are typically audio only. It becomes obvious that the "optimal" transmission becomes somewhat subjective depending on the applications priority of advanced features such as height and depth rendering. For the purposes of this description, we will focus on a system that requires full 3D and head or positional tracking such as virtual reality. A generalized scenario is provided in FIG. 18, which is an example optimal transmission scenario for virtual reality.

It is desirable to remain output format agnostic and support decoding to any layout or rendering method. An application may be trying to encode any number of audio objects (mono stems with position), base/bedmixes, or other soundfield representations (such as Ambisonics). Using optional head/position tracking allows for recovery of sources for redistribution or to rotate/translate smoothly during rendering. Moreover, because there is potentially video, the audio must be produced with relatively high spatial resolution so that it does not detach from visual representations of sound sources. It should be noted that the embodiments described herein do not require video (if not included, the A/V muxing and demuxing is not needed). Further, the multichannel audio codec can be as simple as lossless PCM wave data or as advanced as low-bitrate perceptual coders, as long as it packages the audio in a container format for transport.

Objects, Channels, and Scene Based Representation

The most complete audio representation is achieved by maintaining independent objects (each consisting of one or more audio buffers and the needed metadata to render them with the correct method and position to achieve desired result). This requires the most amount of audio signals and can be more problematic, as it may require dynamic source management.

Channel based solutions can be viewed as a spatial sampling of what will be rendered. Eventually, the channel representation must match the final rendering speaker layout or HRTF sampling resolution. While generalized up/down-mix technologies may allow adaption to different formats, each transition from one format to another, adaption for head/position tracking, or other transition will result in "repanning" sources. This can increase the correlation between the final output channels and in the case of HRTFs may result in decreased externalization. On the other hand, channel solutions are very compatible with existing mixing architectures and robust to additive sources, where adding additional sources to a bedmix at any time does not affect the transmitted position of the sources already in the mix.

Scene based representations go a step further by using audio channels to encode descriptions of positional audio. This may include channel compatible options such as matrix encoding in which the final format can be played as a stereo pair, or "decoded" into a more spatial mix closer to the original sound scene. Alternatively, solutions like Ambisonics (B-Format, UHJ, HOA, etc.) can be used to "capture" a soundfield description directly as a set of signals that may or may not be played directly, but can be spatially decoded and rendered on any output format. Such scene-based methods can significantly reduce the channel count while providing similar spatial resolution for a limited number of sources; however, the interaction of multiple sources at the scene level essentially reduces the format to a perceptual direction encoding with individual sources lost. As a result, source leakage or blurring can occur during the decode process lowering the effective resolution (which can be improved with higher order Ambisonics at the cost of channels, or with frequency domain techniques).

Improved scene-based representation can be achieved using various coding techniques. Active decoding, for example, reduces leakage of scene-based encoding by performing a spatial analysis on the encoded signals or a partial/passive decoding of the signals and then directly rendering that portion of the signal to the detected location via discrete panning. For example, the matrix decoding process in DTS Neural Surround or the B-Format processing in DirAC. In some cases, multiple directions can be detected and rendered, as is the case with High Angular Resolution Planewave Expansion (Harper).

Another technique may include Frequency Encode/Decode. Most systems will significantly benefit from frequency-dependent processing. At the overhead cost of time-frequency analysis and synthesis, the spatial analysis can be performed in the frequency domain allowing non-overlapping sources to be independently steered to their respective directions.

An additional method is to use the results of decoding to inform the encoding. For example, when a multichannel based system is reduced to a stereo matrix encoding. The matrix encoding is made in a first pass, decoded, and analyzed versus the original multichannel rendering. Based on the detected errors, a second pass encoding is made with corrections that will better align the final decoded output to the original multichannel content. This type of feedback system is most applicable to methods that already have the frequency dependent active decoding described above.

Depth Rendering and Source Translation

The distance rendering techniques previously described herein achieve the sensation of depth/proximity in binaural renderings. The technology uses distance panning to distribute a sound source over two or more reference distances. For example, a weighted balance of far and near field HRTFs are rendered to achieve the target depth. The use of such a distance panner to create submixes at various depths can also be useful in the encoding/transmission of depth information. Generally, the submixes represent the same directionality of the scene encoding, but the combination of submixes reveals the depth information through their relative energy distributions. Such energy distributions can include a direct quantization of depth, for example being evenly distributed or grouped for relevance such as "near" and "far". In an example, such energy distributions can include a relative steering or closeness or far-ness relative to a reference distance, e.g., some signal being understood to be nearer than the rest of the far-field mix.

In an example where no distance information is transmitted, a decoder can use depth panning to implement 3D head-tracking including translations of sources. In an example, sources represented in the mix can be assumed to originate from a reference direction and reference distance. As the listener moves in space, the sources can be re-panned using a distance panner to introduce a sense of changes in absolute distance from the listener to the source. If a full 3D binaural renderer is not used, other methods to modify a listener's perception of depth can be used, for example, as described in commonly-owned U.S. Pat. No. 9,332,373, the contents of which are incorporated herein by reference. Importantly, the translation of audio sources requires modified depth rendering as will be described herein.

Transmission Techniques

FIG. 19 shows a generalized architecture for active 3D audio decoding and rendering. The following techniques are available depending on the acceptable complexity of the encoder or other requirements. Some solutions discussed herein are assumed to benefit from frequency-dependent active decoding as described above. It can also be seen that several techniques are focused on ways of encoding depth information, where a motivation for using the hierarchy is that other than audio objects, depth is not directly encoded by any of the classical audio formats. That is, depth can be a "missing" dimension that needs to be reintroduced. FIG. 19 is a block diagram for a generalized architecture for active 3D audio decoding and rendering that can include or use depth extraction and reintroduction. The signal paths are shown with single arrows for clarity, but it should be understood that they represent any number of channels or binaural/transaural signals or signal pairs.

In the example of FIG. 19, audio signals and optionally data sent via audio channels or metadata are processed using spatial analysis 32. At the spatial analysis 32, a desired direction and/or depth can be determined at which to render information, for example for each of multiple time-frequency bins. Audio sources can be reconstructed via signal forming 34, such as can include providing a weighted sum of the audio channels, passive matrix, or ambisonic decoding. The audio sources are then actively rendered by active steering 38 to the desired positions in the final audio format including any adjustments for listener movement via head or positional tracking, such as from head tracker 36.

The illustrated processes occur within a time-frequency analysis/synthesis processing block (e.g., as indicated by the FFT 30 and IFFT 40 modules), however it is understood that frequency processing need not be based on FFT, and it can instead use any other time-frequency representation. Additionally, all or part of the key blocks could be performed in the time domain (without frequency dependent processing). For example, this system can be used to create a new channel-based audio format that can be later rendered by a set of HRTFs/BRIRs, such as in another mix of time and/or frequency domain processing.

The head tracker 36 can be understood to be any indication of rotation and/or translation for which the 3D audio should be adjusted for a particular listener. Typically, the adjustment will be the Yaw/Pitch/Roll, quaternions or rotation matrix, and a position of the listener that is used to adjust the relative placement. The adjustments can be performed such that the audio program maintains an absolute alignment with an intended sound scene or with other visual components. While active steering may be a likely application, this position information can be used to inform decisions in other processes such as source signal forming. In an example, the head tracker 36 provides an indication of a listener's head rotation and/or translation, such as can be determined from listener-worn sensors or other environment sensors configured to sense a location or orientation of a listener. In an example, a listener-worn sensor can include a head-worn virtual reality or augmented reality headset, a portable electronic device with inertial or location sensors, or an input from another rotation and/or translation tracking electronic device. Position information from the head tracker 36 about rotation and/or translation can be provided as a user input, such as a user input from an electronic controller.

Various solutions are provided and discussed below. Each solution includes or uses at least a primary audio signal. This signal can be any spatial format or scene-encoded signal and can, in some examples, be a combination of a multichannel audio mix, matrix/phase encoded stereo pairs, or ambisonic mixes. In an example, each signal is based on a traditional representation, and it can be expected that each submix represents, e.g., left/right, front/back and ideally top/bottom (height) for a particular distance or combination of distances.

Additional Optional Audio Data signals, which do not represent audio sample streams, may be provided as metadata or encoded as audio signals. They can be used to inform the spatial analysis or steering; however, because the data is assumed to be auxiliary to the primary audio mixes they are not typically required to form audio signals for a final rendering. Generally, if metadata is available, then it can be expected that a solution would not use "audio data," but hybrid data solutions are also possible. Similarly, it can be assumed that the simplest and most backwards-compatible systems will rely on true audio signals alone.

Depth-Channel Coding

A Depth-Channel Coding or "D" channel includes information about a primary depth/distance for each time-frequency bin of a given submix is encoded into an audio signal, for example using magnitude and/or phase, for each bin. For example, the source distance relative to a maximum/reference distance is encoded by the magnitude per-pin relative to 0 dBFS such that –inf dB is a source with no distance and full scale is a source at a reference or maximum distance. It can be assumed that beyond a reference distance or maximum distance that sources are considered to change only by reduction in level or other mix-level indications of distance, such as can be possible in legacy mixing formats. In other words, the a maximum or reference distance can be a distance at which a source is otherwise rendered without depth coding, sometimes referred to as the far-field.

Alternatively, the "D" channel can be a steering signal such that the depth is encoded as a ratio of the magnitude and/or phase in the "D" channel to one or more of the other primary channels. For example, depth can be encoded as a ratio of "D" to the omni "W" channel in Ambisonics. By making it relative to other signals instead of 0 dBFS or some other absolute level, the encoding can be more robust to the encoding of the audio codec or other audio process such as level adjustments.

If the decoder is aware of the encoding assumptions for this audio data channel, it will be able to recover the needed information even if the decoder time-frequency analysis or perceptual grouping is different than is used in the encoding process. A problem to be solved with such systems can be that a single depth value is encoded for a given submix. Accordingly if multiple overlapping sources are to be represented, then the sources are sent in separate mixes or a dominant distance is selected. While it is possible to use this system with multichannel bedmixes, it is more likely such a channel would be used to augment ambisonic or matrix encoded scenes where time-frequency steering is already being analyzed in the decoder and channel count is kept to a minimum.

Ambisonic Based Encoding

For a more detailed description of proposed Ambisonic solutions, see the "Ambisonics with Depth Coding" section above. Such approaches will result in a minimum of a 5-channel mix W, X, Y, Z, and D for transmitting B-Format signals with depth. A Faux Proximity or "Froximity" method is also discussed where the depth encoding must be incorporated into the existing B-Format by means of energy ratios of the W (omnidirectional channel) to X, Y, Z directional channels. While this allows for transmission of only four channels, it has other shortcomings that might best be addressed by other 4-channel encoding schemes.

Matrix Based Encodings

In an example, a matrix system could employ a D channel to add depth information to what is already transmitted. In on example, a single stereo pair is gain-phase encoded to represent both azimuth and elevation headings to the source at each subband. Thus, 3 channels (e.g., MatrixL, MatrixR, D) would be sufficient to transmit full 3D information and the MatrixL and MatrixR signals can provide a backwards compatible stereo downmix.

Alternatively, height information could be transmitted as a separate matrix encoding for height channels (MatrixL, iatrixR, HeightMatrixL, HeightMatrixR, D). However, in that case, it may be advantageous to encode "Height" similar to the "D" channel. That would provide (MatrixL, MatrixR, H, D) where MatrixL and MatrixR represent a backwards-compatible stereo downmix and H and D are optional Audio Data channels for positional steering.

In a special case, the "H" channel could be similar in nature to the "Z" or height channel of a B-Format mix. Using positive signal for steering up and negative signal for steering down, a relationship of energy ratios between "H" and the matrix channels can be used to indicate how far to steer a signal up or down, similarly to using an energy ratio of "Z" to "W" channels in a B-Format mix.

Depth-Based Submixing

Depth-based submixing can include or use two or more mixes at different depths such as a far depth (e.g., corresponding to a typical rendering distance) and a near depth (e.g., proximity). While a complete description can be achieved by a depth zero or "middle" channel and a far (e.g., maximum distance) channel, more transmitted depths can correspond to more accuracy and flexibility at the final rendering. In other words, a number of available submixes can act as a quantization on the depth of each individual source. Sources that fall exactly at a quantized depth can be directly encoded with the highest accuracy, so it is also advantageous for the submixes to correspond to relevant depths for the renderer. For example, in a binaural system, the near-field mix depth should correspond to the depth of near-field HRTFs and the far-field should correspond to our far-field HRTFs. The main advantage of this method over depth coding is that mixing is additive and does not require advanced or previous knowledge of other sources. In a sense, it is transmission of a "complete" 3D mix.

FIG. 20 shows an example of depth-based submixing for three depths. As shown in FIG. 20, the three depths may include middle (meaning center of the head), near field (meaning on the periphery of the listeners head) and far-field (meaning our typical far-field mix distance). Any number of depths could be used, but FIG. 20 (like FIG. 1A) corresponds to a binaural system in which HRTFs are sampled very near the head (e.g., corresponding to the near-field) and are sampled at a typical far-field distance, such as greater than 1 meter and typically 2-3 meters. When source "S" is exactly the depth of the far-field, it will be only included in the far-field mix. As the source extends beyond the far-field, its level can decrease and optionally it can become more reverberant or less "direct" sounding. In other words, the far-field mix is the way it would be treated in standard 3D legacy applications. As the source transitions toward the near-field, the source is encoded in the same direction of both the far and near field mixes until the point where it is exactly at the near-field from where it will no longer contribute to the far-field mix. During this cross-fading between the mixes, an overall source gain can increase and the rendering can become more direct or dry to create a sense of "proximity." if the source continues into the middle of the head ("M"), then the source will eventually be rendered on multiple near-field HRTFs or one representative middle HRTF such that the listener does not perceive the direction, but instead the listener perceives the source as if it is coming from inside the head. While it is possible to do this inner-panning on the encoding side, transmitting a middle signal allows the final renderer to better manipulate the source in head-tracking operations as well as in choosing a final rendering approach for "middle-panned" sources based on the final renderer's capabilities.

Because this method relies on crossfading between two or more independent mixes, there is more separation of sources along the depth direction. For example source S1, and S2 with similar time-frequency content, could have the same or different directions, different depths and remain fully independent. On the decoder side, the far-field can be treated as a mix of sources all with a reference distance D1, and the near field will be treated as a mix of sources all with a different reference distance D2. However, there must be compensation for the final rendering assumptions. Take for example D1=1 (a reference maximum distance at which the source level is 0 dB) and D2=0.25 (a reference distance for proximity where the source level is assumed to be +12 dB). Since the renderer is using a distance panner that will apply 12 dB gain for the sources it renders at D2 and 0 dB for the sources it renders at D1, the transmitted mixes should be compensated for the target distance gain.

In an example, if the mixer placed source S1 at a distance D halfway between D1 and D2 (50% in near and 50% in far), the mixed source would ideally have 6 dB of source gain. In an example, this can be encoded as "S1 far" with 6 dB in the far-field and "S1 near" at −6 dB (e.g., 6 dB-12 dB) in the near field. When decoded and re-rendered, the system will play S1 near at +6 dB (e.g., 6 dB−12 dB+12 dB) and S1 far at +6 dB (e.g., 6 dB+0 dB+0 dB).

Similarly, if the mixer paces source S1 at distance D=D1 in the same direction, it would be encoded with a source gain of 0 dB in only the far-field. If, during rendering, the listener moves in the direction of S1 such that D again equals a distance halfway between D1 and D2, the distance panner on the rendering side will again apply a 6 dB source gain and redistribute S1 between the near and far HRTFs. This results in the same final rendering as discussed above. It is understood that this is just illustrative and that other values, including cases where no distance gains are used, can be accommodated in the transmission format.

Ambisonic Based Encodings in the case of ambisonic scenes, a minimal 3D representation consists of a 4-channel B-Format (W, X, Y, Z) with a middle channel. Additional depths can be presented in additional B-Format mixes of four channels each. In an example, a full Far-Near-Mid encoding would require nine channels. However, since the near-field is often rendered without height it is possible to simplify near-field to be horizontal only. A relatively effective configuration can then be achieved in eight channels (W, X, Y, Z far-field, W, X, Y near-field, Middle). In this case, sources panned into the near-field can have their height projected into a combination of the far-field and/or middle channel. This can be accomplished using a sin/cos fade (or similar processing method) as the source elevation increases at a given distance.

If the audio codec requires seven or fewer channels, it may still be preferable to send (W, X, Y, Z far-field, W, X, Y near-field) instead of the minimal 3D representation of (W X Y Z Mid). The trade-off is in depth accuracy for multiple sources versus complete control into the head. If it is acceptable that the source position be restricted to greater than or equal to the near-field, the additional directional channels will improve source separation during spatial analysis of the final rendering.

Matrix Based Encodings

By similar extension, multiple matrix or gain/phase encoded stereo pairs can be used. For example, a 5.1 transmission of MatrixFarL, MatrixFarR, MatrixNearL, MatrixNearR, Middle, LFE could provide information for a full 3D soundfield. If the matrix pairs cannot fully encode height (for example, if backwards-compatibility is desired), then an additional MatrixFarHeight pair can be used. A hybrid system using a height steering channel can be added similarly to what was discussed above with respect to D channel coding. However, it is expected that for a 7-channel mix, the ambisonic methods above are preferable.

On the other hand, if a full azimuth and elevation direction can be decoded from the matrix pair then the minimal configuration for this method is 3 channels (MatrixL, MatrixR, Mid) which is already a significant savings in the required transmission bandwidth, even before any low-bitrate coding.

Metadata/Codecs

The methods described herein (such as "D" channel coding) can be aided by metadata, such as can be used to ensure the data is recovered accurately on a decoder side of the audio codec. However, such methods are generally not compatible with legacy audio codecs.

Hybrid Solution

While discussed separately above, it is well understood that the optimal encoding of each depth or submix could be different depending on the application requirements. As noted above, it is possible to use a hybrid of matrix encoding with ambisonic steering to add height information to matrix-encoded signals. Similarly, it is possible to use D-channel coding or metadata for one, any or all of the submixes in a Depth-Based submix system.

It is also possible that depth-based submixing can be used as an intermediate staging format. Once the mix is completed, "D" channel coding can be used to further reduce a channel count, thereby encoding multiple depth mixes into a single mix plus depth.

In an example, the several techniques can be used together. The mix can be first decomposed with a distance panner into depth-based submixes whereby a depth of each submix is constant, thereby allowing an implied depth channel which is not transmitted. In such a system, depth coding can be used to increase depth control while submixing can be used to maintain better source direction separation than would be achieved through a single directional mix. A final compromise can be selected based on application-specific parameters, such as a particular audio codec, maximum allowable bandwidth, or other rendering requirements. It can be understood that the various interests can be differently balanced for each submix, such as in a particular transmission format, and a final decoding layout may be different still. For example, a final decoding can depend on particular renderer capabilities to render particular channels.

The various systems and methods discussed herein can be configured to identify, manipulate, and render individual audio source components from optimally encoded 3D audio mixes or submixes, such as can be provided for respective different azimuth, elevation, and depth locations relative to a listener. In an example, the systems and methods facilitate decoupling of various depth-encoding techniques and corresponding decoder or renderer requirements. In some examples, such as the binaural renderer described herein, can be configured to allow spatial performance to be tailored to a particular playback environment or platform (e.g., mobile, PC, VR, AR, home theater, etc.). The various examples discussed herein can also be used to improve rendering for applications that include or use 6 degree-of-freedom listener tracking (such as via the head tracker 36 and yaw, pitch, roll orientation+X, Y, and/or Z position information).

In an example, various improvements can be made to the above-described systems and methods for transmitting 3D audio mixes, for example using a set of depth-based submixes. In an example, a 3D audio mix can include or use at least two different mixes of signals, such as corresponding to at least two respective different depths relative to a reference listener position. The 3D audio mix can include any level of depth quantization, that is, it can include up to n different mixes. In an example, at least one of the n mixes can include or represent spatial information. That is, the at least one mix can include direction information about one or more of the audio signals. Some examples of such 3D audio mixes can include Ambisonics, multiple channels (e.g., surround sound), and matrix-encoded signals. In an example, the direction information can include height information and/or can include information to represent all directions on a sphere of respective distances from a listener (see, e.g., the example of FIG. 1B). Those skilled in the art will recognize that other shapes are possible for multichannel speaker systems, such as irregular polygons, etc. However, such systems can be considered as having additional or more submixes at different respective depths or can have their channel depths normalized. In an example, systems or methods that include or use multiple mixes with associated intermediate depths and with limited spatial information can be used. In an example, systems or methods that include or use one mix that does not have spatial limitations can be used (e.g., a mix without directional information) and that mix can be, for example, one that corresponds to Depth=0 (e.g., at a reference position for the listener). In the example of FIG. 20, a mix corresponding to Depth=0 is referred to as including a Middle channel.

In an example, one or more audio sources can be added to a 3D audio mix. To add a source, the source can be rendered using the systems and methods discussed herein with the directional mixes at each depth and their respective submix contributions can be weighted according to a true or intended depth of the source. In an example, the directional contributions can be determined by panning restrictions associated with the particular spatial audio format being used. For example, channels can be panned using vector base amplitude panning (VBAP) or the energy-based vector base intensity panning (VBIP), or using Furse-Malham (FuMa) weighting, among other techniques and panning conventions. Distance weighting can similarly be chosen by convention. For example, a source placed at a distance between two submix depths can be represented by equal contributions to each of the adjacent submixes. If, however, the source to be added overlaps with a particular one of the submixes, then the source can predominantly contribute to that particular one of the submixes and can have lesser or zero influence or contribution to the other submix(es). Intermediate values will transition between the two extremes. In an example, such submixing can be substantially continuous and represent a linear crossfading between the adjacent submixes, such as based on the relative distances. In an example, if the chosen function is monotonic and thus reversible with a one-to-one mapping, then non-linear crossfading can similarly be used. In an example, logarithmic, warped, piece-wise, or other fading or signal blending methods can be used.

As discussed above, an example can include different submixes that correspond to far-field and near-field (or proximate mixes to represent sources near the listener's head). For example, when a source or mix to be included sufficiently aligns with known far-field and near-field inputs to a renderer, then the combination of sources rendered in the far and near fields produce a combined audio image that approximates the intended depth of a given source to be included.

In an example, a source or mix to be included is positioned intermediately between a near-field and far-field, as shown in the example of FIG. 1A for the object 22. In an example, a binaural renderer can be used to render a composite source (e.g., object 22) using weightings of the spatial/directional HRTFs at different depths (e.g., denoted Hxx in FIG. 1A) and crossfading depth weights (e.g., denoted Wxx in FIG. 1A) to produce the sensation, or perception by the listener, that the object 22 is rendered at the location of object 22 between the near-field and far-field. In an example, if multiple sources are mixed such that decoding yields radial weights $W_{11}$, $W_{12}$, $W_{21}$, and $W_{22}$, as illustrated in FIG. 1A, then the respective contributions to each depth can be apportioned according to the weights for $W_{R1}$ and $W_{R2}$.

In an example, the systems and methods discussed herein can include or use spatial repositioning or tracking to accommodate a listener position for each of multiple directional mixes. That is, the systems and methods can be configured to render the multiple submixes with updated depth and/or direction characteristics depending on a listener position, including as the listener position changes over time. As a result, the listener can perceive the audio source to be rendered as being anchored in 3D space (e.g., if the source to be rendered is intended to be stationary) and the listener is free to move around it. Such methods may also be simulated without actual listener tracking. In such examples, the listener perspective is controlled by other means such as automation, mouse/keyboard inputs, or other control inputs.

A problem to be solved can include decoding and rendering submixes when a particular source, or information corresponding to a common source, is encoded into more than one submix. For example, rendering issues can be presented when contributions of the particular source are treated independently with the different submixes. For example, as the listener moves relative to the spatial positioning of the submixes, the listener can encounter a first component (e.g., due to a first submix associated with a first spatial position or depth) of the particular source at a different position than the listener encounters a second component (e.g., due a second submix associated with a second spatial position or depth) of the same particular source.

Furthermore, a lack of spatial fidelity can be exposed in stationary conditions when submix depth quantization is low. For example, if a system can transmit a limited number of audio channels (e.g., 5 audio channels), the selected channels may be WXYZ+M where WXYZ are ambisonics channels and M is a middle channel. While a continuous crossfade from farfield ambisonics to M is possible, psychoacoustic effects of the source combination may not be strong enough to provide a smooth or continuous trajectory as the source approaches a listener's head; which in turn can lead to a perceived collapse of sources towards the listener. If the renderer is configured to use received submixes to provide information corresponding to intermediate depths, then it would be preferred to first identify a true or desired depth of the particular source and then render the combination at the desired depth.

Depth Extraction

The present inventor has recognized that a solution to the above-described problems can include or use systems and methods for depth extraction. The systems and methods can further include decoupling an encoding format from rendering capabilities of specific decoders, thereby providing a more modular and scalable solution that can be deployed on a wide range of platforms and systems (e.g., platforms including mobile telephones, PCs, home theaters, VR, AR, etc.), including legacy systems. The various solutions discussed herein can be applied using time-domain and/or frequency-domain processing and for one or multiple audio sources independently or concurrently. For brevity, the following example describes analyzing sources with processing in the frequency domain. In the example, the sources or source components are encoded in a 3D spatial audio submix that includes a far-field ambisonic mix (e.g., including signals WXYZ) and includes a middle channel (e.g., including signal M) with a depth of 0.

Figure 25:
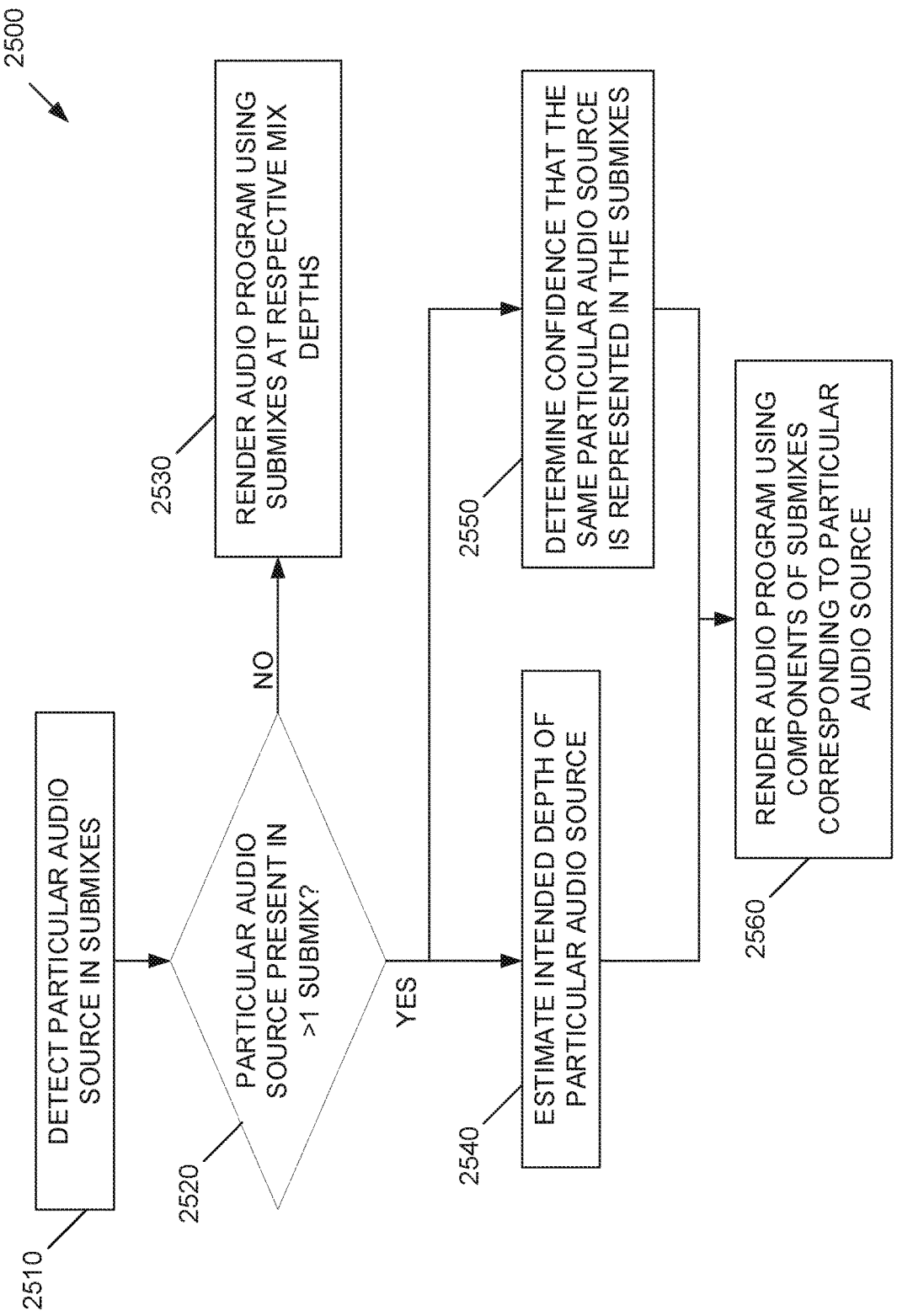
FIG. 25 illustrates generally an example of a method that includes using depth information to determine how to render a particular source.

FIG. 25 illustrates generally an example of a method 2500 that includes using depth information to determine how to render a particular source. In the example, information about the particular source can be included in one or more submixes comprising the audio program to render. At step 2510, the example can include analyzing the submixes to detect whether information about the particular audio source is, or is likely to be, included in each of the submixes. That is, various candidate components of the particular audio source can be analyzed or identified to determine whether the candidate components correspond to the particular audio source of interest. In an example, the submixes can be processed using FFT 30 or another time-frequency filter bank to create a time-frequency representation that can be analyzed. In an example, step 2510 includes detecting the particular audio source in the spatial audio mixes by detecting signal energies in representative time-frequency tiles corresponding to the omni channels (e.g., using signals W and M) of each of the submixes. In an example, the signal energies can be measured as amplitude or RMS energies corresponding to key frequency bins or of an average of multiple bins in a band corresponding to the particular audio source. In an example, one or more bins or bands can be perceptually grouped, such as using a Bark or ERB scale, among others. In an example, such bin or band information can be smoothed over time such as using a forgetting factor, leaky integrator or similar method.

Step 2520 can include determining whether the particular audio source is present in more than one of the submixes. When information corresponding to the particular audio source is not detected in at least two submixes, then no further comparison may be needed and the respective submixes can be maintained at their respective mix depths. Accordingly, at step 2530, an audio program comprising the at least two submixes can be rendered using the submixes at their respective mix depths (e.g., far-field and near-field depths). Thus any contributions to the particular audio source will be provided at a spatial depth at which the submix was intended and any particular audio source components that are zero will not affect a listener's perception of an accuracy of the localization of the particular audio source, including when such contributions are "rendered" at an incorrect depth.

At step 2520, if the particular audio source is determined to be present in more than one submix, then the example can continue at step 2540 and/or step 2550.

At step 2540, an intended depth of the particular audio source can be detected for each of the different submixes. In an example, intended depth information can be determined from metadata associated with one of the submixes or channels. In an example, when signals or information corresponding to the particular audio source are detected in one or more of the respective omni channels, then the corresponding detected signal levels can be compared, such as using a ratio. The ratio can be used, such as together with knowledge of the encoding scheme, to estimate an originally-intended depth of the source. Techniques other than using a ratio can similarly be used. For example, step 2540 can include or use an inverse function of the radial panning weights used in the encoding function. In an example, step 2540 can include or use a lookup table with values of the depth quantization at various supported depths. In such an example, a nearest approximate or interpolated value can be used to assign or estimate a depth for the particular audio source. In another example, step 2540 can include or use depth-indicating information that is implied by a context or content of information from the different submixes.

Step 2550 can include determining a confidence that information about the same particular audio source is represented in the submixes to be rendered. That is, step 2550 can include verifying that the analyzed information corresponds to a common virtual source to be rendered together at a specified location or depth, including a depth other than is associated with one of the existing submixes. In an example, there can be a second audio source, other than the particular audio source, that is also included in a submix. Ideally, the particular audio source and the second audio source would be separated or differentiated by different frequency or spectral content. However, when there is overlap in frequency, then there may be less confidence that the estimated depths (e.g., from step 2540) are accurate. In other examples, a depth can fluctuate as the particular audio source and the second audio source modulate one another. In an example, a solution to such content overlaps or fluctuations includes determining a confidence that the audio sources are or are not in fact related.

In an example, determining a confidence at step 2550 can include various means or methods for providing a relatedness metric or indication of a belongingness between one or more candidate components of the particular audio source from different submixes or spatial audio signals. In an example, determining the confidence at step 2550 can include or use information about signal correlation. Where high correlation exists between, for example, the omni signal components of the respective submixes, then the determined confidence can be high that the particular audio source and the second audio source refer to the same source. If the determined confidence at step 2550 meets or exceeds a specified threshold level of confidence, then the example can continue at step 2560 with rendering the audio program. If a low correlation is determined at step 2560, then the source component positions can be relatively untouched or unmodified at rendering. In an example, various functions can be used to scale back a change of source position.

In an example, determining a confidence at step 2550 can include or use direction information. For example, when both submixes or signals contain directional components associated with the particular audio source and the second audio source, then the determination at step 2550 can include information about whether the directional components are co-located or correspond in space. If the submixes do not include sufficient directional information, a source can be detected at a non-zero depth, for example if it is equally contained in both the far-field and Middle channels. While a far-field source can be adjusted to render with the detected depth, the Middle channel lacks a direction at which to render. In this case, the directional component of the far-field can be assumed for the middle signal.

In an example, the various examples of confidence determination at step 2550 can be used together or combined, such as with appropriate weighting to further increase a confidence. The confidence components or composite confidence metric can be smoothed through various methods resulting in a final confidence "C."

Decisions about whether a particular audio source is in, or includes information in, multiple submixes can change with the submixes used in the analysis. Furthermore, binary decisions or abrupt movements can create audio artifacts, and therefore it can be helpful to smooth depth estimates and or final panning weights used in rendering. This can be achieved through one of several methods including a forgetting factor, or leaky integrator, etc. One example can include using an equation Depth(n)=(1−α)*NewEstimate(n)+α*Depth(n−1), wherein α is forgetting factor with values closer to 1 slowing the change of depth.

At step 2560, the audio program can be rendered, including the particular audio source rendered at its intended position. For example, step 2560 can include or use the estimated depths from step 2540 and the respective components of the audio submixes to render the particular audio source at its intended position.

In an example, step 2560 includes rendering an audio program with submix depth modifications. The particular audio source components can be mixed in the submixes and detected as sub-sources designated "SFar" and "SMid" and can have respective estimated depths "D" and confidence "C." In an example, SFar can have a spherical position of the far-field radius R and direction (θ,ϕ). SMid can be referenced with a radius of 0 and assumed direction (θ,ϕ) from the far-field. A depth of the sub-sources can then be modified, for example, by applying the confidence to the difference in radius of each sub-source:

$S\text{Mid modified Radius} = C*D$ $S\text{Far modified Radius} = C*(D-R\text{far}) + R\text{Far}$ As can be seen, when the confidence approaches 1, then the modified radius of both sources will be equal to D, the intended source distance.

Figure 26:
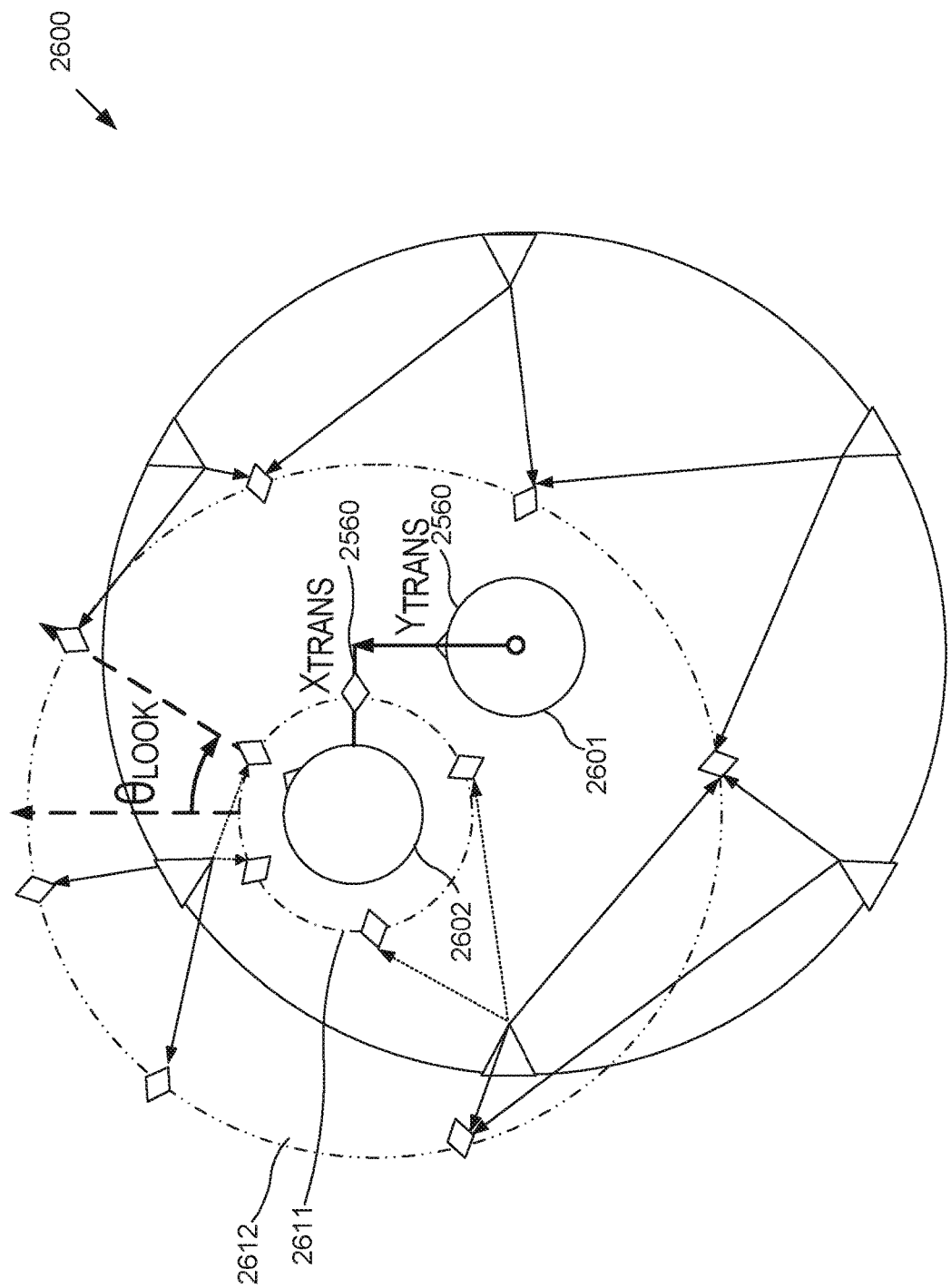
FIG. 26 illustrates generally an example that includes updating HRTFs to accommodate an updated listener position.

FIG. 26 illustrates generally an example 2600 that includes redistributing information from various original source locations (denoted by triangles) into HRTF positions (denoted by diamonds) to accommodate an updated listener position. In the example 2600, the input includes only a representative distribution of far-field sources, denoted by the triangles. Other positions are possible and can be inferred by the representative behavior. In the example, the listener moves within a listening environment from a first listener position 2601 to a second listener position 2602. At the first listener position 2601, the listener has a first look direction $\theta_0$ (e.g., zero degrees relative to an "up" or "forward" direction in the figure), and at the second listener position 2602, the listener has a different second look direction, $\theta_{LOOK}$ that is offset from $\theta_0$. When the listener is located at the first listener position 2601, the decoder can render ambisonic program information through standard means, such as decoding the source signals to a plurality of channels located around the listener corresponding to HRTF positions of the final 3D audio renderer. As the listener moves or translates to the second listener position 2602, the decoding for the source signals about the listener can accommodate the new listener position such that some information from the ambisonic program that is at or near an updated near-field 2611 for the listener can be rendered using the near-field HRTF channels and some information that remains in a far-field 2612 for the listener can be rendered using the far-field HRTF channels.

In an example, information from the head tracker 36 can be received and considered for further processing or active steering 38, such as to determine a magnitude and direction of listener movement. That is, using information from the head tracker 36, changes in listener position or perspective can be accommodated by, for example, using active decoding to effect changes to one or more of the effective source radii (e.g., relative to one or more submix reference depths and depending on the direction of travel) and a listener's look direction $(\theta, \phi)$. Unlike passive decoding in which headtracking operations include relative signal manipulations, active decoding can be used to identify specific directional coordinates of audio sources. In such cases, the adjustments can be realized by processing listener coordinates using an affine transform matrix or quaternion operation selected to represent the relative shift in perspective, such as to provide modified listener coordinates. The modified coordinates can be used with the original audio signal components or submixes to render an audio program for a listener at the new or updated position or look direction.

Modified depth information for a listener relative to one or more submixes can be applied in various ways. In an example, modified depth information can be used in active rendering applications where submixes can be rendered with new positions associated with final positions of the various sources relative to the listener. In an example, the various sources can be combined to create new audio stem information, such as a monophonic stem with metadata that represents a newly-detected depth and combined position. In this example, the extracted source and location parameters can be applied using various other object-based rendering systems to reproduce the sources.

Figure 27B:
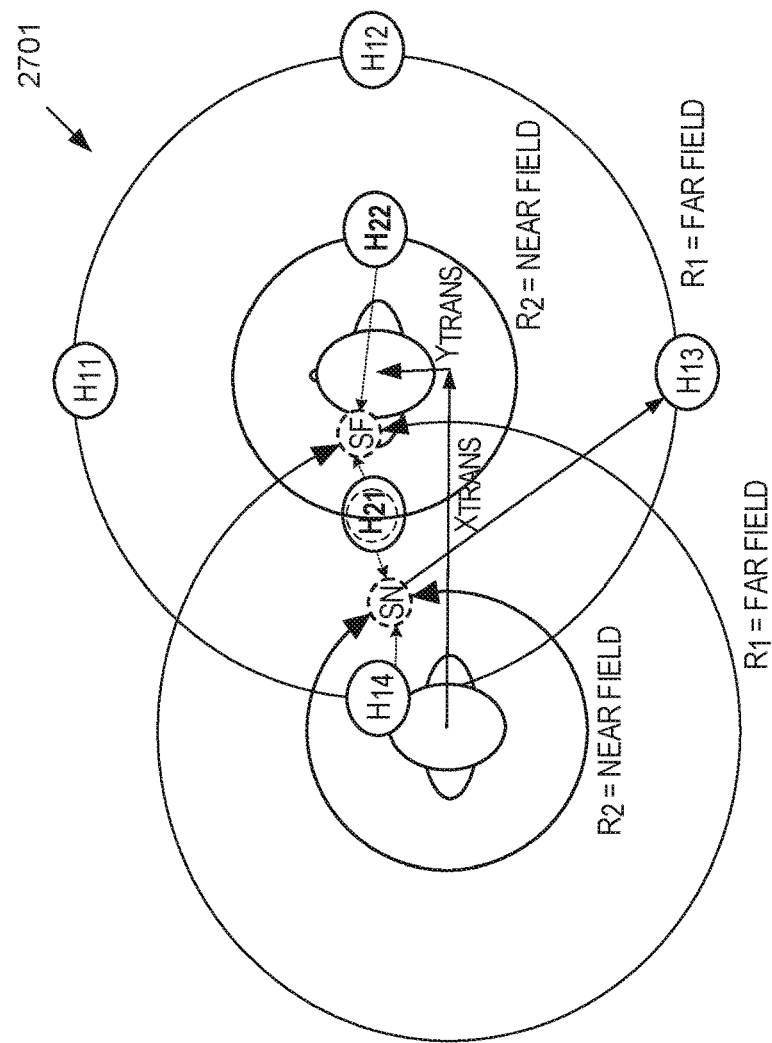
FIGS. 27A-27C illustrate generally examples of encoding and/or decoding processes with and without depth extraction.
Figure 27A:
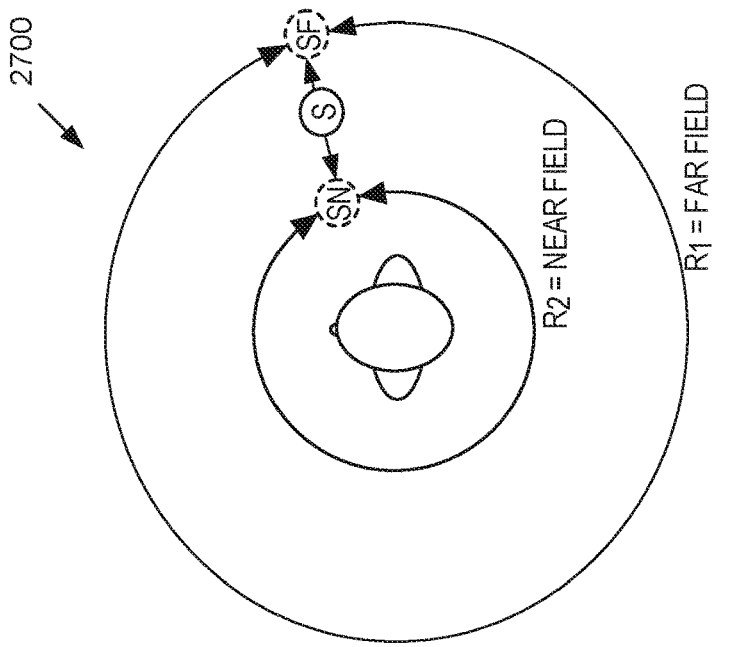

FIG. 27A illustrates generally an example 2700 that includes a source S as encoded for a first listener, located at the illustrated position, using near-field information (corresponding to a radius R2) and far-field information (corresponding to a radius R1). In the example of FIG. 27A, the source S is represented as a near-field source component SN and a far-field source component SF. That is, SN and SF represent ambisonic information corresponding to two different submixes that, when rendered together for the listener and when the listener is located at the illustrated position, produce the source S.

FIG. 27B illustrates generally an example 2701 that shows source rendering for a listener when the listener is in located in a new location, but without depth extraction. In this example, since the location of desired source S may not be known, source SN can be distributed into a combination of near-field and far-field signals for the updated listener position, and source SF can be provided inside the near-field only. In this example, the dashed lines show contributions from the respective sources SN and SF into the various HRTFs (denoted Hxx) for the listener at the new location. The original source location, S, is indicated by the shaded circle, which in this example coincides with the location of the HRTF $H_{21}$. However, in this example, the source S will not be properly localized for the listener at the updated listener position because of the various contributions to S—that is, SN and SF—being distributed to the multiple HRTFs surrounding their unmodified positions, which can result in spatial and/or timbral smearing. In other words, simply rendering the near-field source component SN and the far-field source component SF using the updated HRTFs can lead to improper localization of the source S as perceived by the listener at the updated listener position.

Figure 27C:
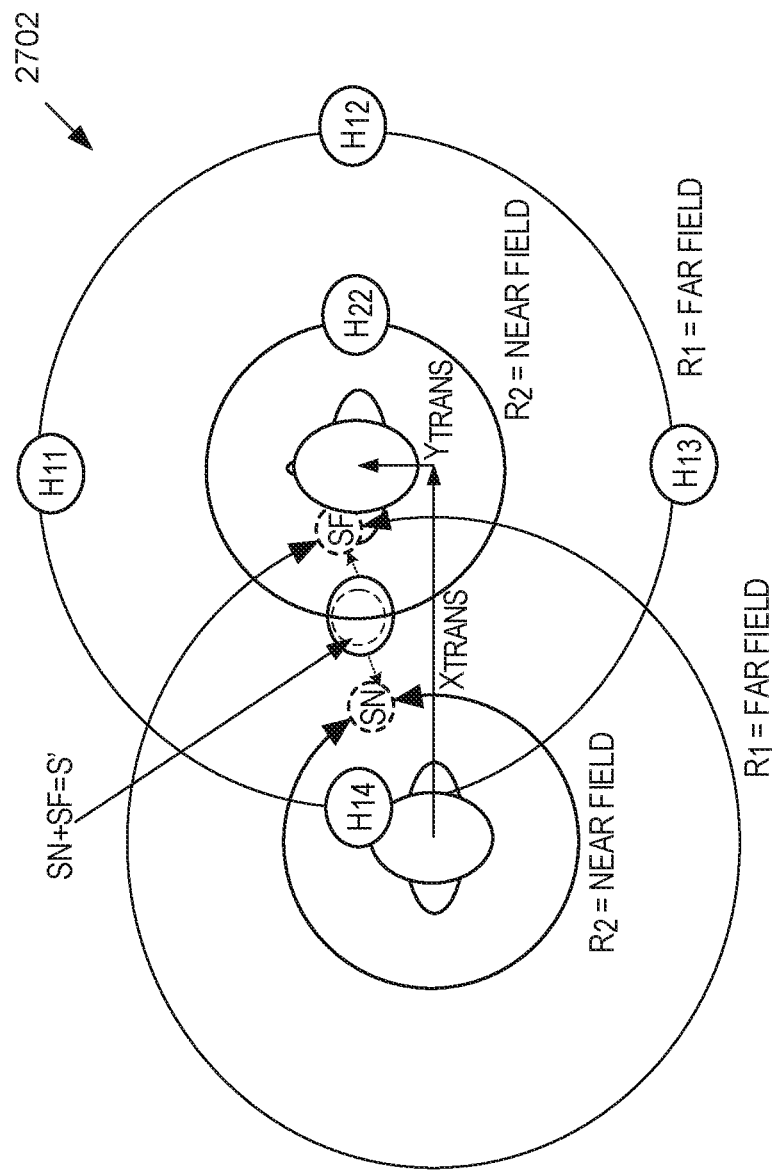

FIG. 27C illustrates generally an example 2702 that shows source rendering for a new source position with depth extraction. In this example, information from the near-field source component SN and information from the far-field source component SF can be "pulled" to a common source location S', corresponding to the originally intended location of the source S. In an example, the source rendering at the location S' occurs when the source component information in each of the near-field and far-field submixes sufficiently corresponds to a common source (that is, to common audio information such that it can be determined to be, or to be intended to be, part of a common source). In this example, because the location S' falls on the nearfield HRTF $H_{21}$, the source can be fully rendered from that position, resulting in the maximum localization accuracy for the example decoder/renderer.

The example 2702 can include identifying, in a near-field submix, source information SN corresponding to the virtual source S. The example 2702 can further include identifying, in a far-field submix, source information SF corresponding to the same virtual source S. Depending on a relatedness of the source information SN and SF, depths at which to render the source information from the respective submixes can be determined. That is, based on how related the information in SN and SF is (such as in terms of frequency content, amplitude, timing, etc.), depths at which to render the information can be selected such that a listener at the updated listener position will perceive the virtual source S substantially as it is intended at the location of S (or S' relative to the updated listener position).

As discussed elsewhere herein, various processing can be used to determine a relatedness of the source information SN and SF from the respective different submixes to the intended virtual source S. In an example, a confidence metric can be used to indicate a belongingness of the source information SN and SF to the same virtual source. Depths at which to render the information SN and SF can then be determined using the confidence metric, for example, by proportionally adjusting one or both depths along a depth spectrum from their respective reference positions to S'. The confidence metric can include, among other things, an energy ratio or relative distribution of the source S in the different submixes, or can include a correlation. In cases where the source information SN and SF is found to be unrelated, then rendering without depth extraction (see, e.g., FIG. 27B) can be used instead.

This disclosure has been described in detail and with reference to exemplary embodiments thereof, it will be apparent to one skilled in the art that various changes and modifications can be made therein without departing from scope of the embodiments. Thus, it is intended that the present disclosure cover the modifications and variations of this disclosure provided they come within the scope of the appended claims and their equivalents.

To better illustrate the methods, systems, devices, and apparatuses disclosed herein, a non-limiting list of example embodiments is provided here.

Example 1 can include or use subject matter such as a method for positioning a virtual source to be rendered at an intended depth relative to a listener position, the virtual source including information from two or more spatial audio signals configured to be spatially rendered together relative to a first listener position, and each of the spatial audio signals corresponding to a different depth relative to a reference position. In Example 1, the method comprises identifying, in each of the spatial audio signals, respective candidate components of the virtual source, determining a first relatedness metric for the identified candidate components of the virtual source from the spatial audio signals, and using the first relatedness metric, determining depths at which to render the candidate components from the spatial audio signals for a listener at the first listener position such that the listener at the first listener position perceives the virtual source substantially at the intended depth.

Example 2 can include, and can optionally be combined with the subject matter of Example 1 to include, determining a confidence for the first relatedness metric, the confidence indicating a belongingness of the one or more candidate components to the virtual source. In Example 2, determining the depths at which to render the candidate components can include proportionally adjusting the depths based on the determined confidence, and proportionally adjusting the depths can include positioning the spatial audio signal components along a depth spectrum from their respective reference positions to the intended depth.

Example 3 can include, and can optionally be combined with the subject matter of Example 2, such that determining the confidence for the first relatedness metric includes using information about a trend, moving average, or smoothed feature of the candidate components.

Example 4 can include, and can optionally be combined with the subject matter of Example 2 or Example 3 such that determining the confidence for the first relatedness metric includes determining whether respective spatial distributions or directions of two or more of the candidate components correspond.

Example 5 can include, and can optionally be combined with the subject matter of Examples 2, 3, or 4 such that determining the confidence for the first relatedness metric includes determining a correlation between at least two of the candidate components of the virtual source.

Example 6 can include, and can optionally be combined with any one or more of Examples 1-5 to include, determining the first relatedness metric including using a ratio of respective signal levels of two of the candidate components.

Example 7 can include, and can optionally be combined with any one or more of Examples 1-6 to include, determining the first relatedness metric including retrieving, from a look-up table, a ratio of respective signal levels for use in rendering the spatial audio signal components, wherein the ratio is selected from the look-up table based on the intended depth. Additionally or alternatively, Example 7 can include, and can optionally be combined with any one or more of Examples 1-6 to include, determining the depths at which to render the candidate components, including (1) comparing a value of the first relatedness metric with values in a look-up table that includes potential values for the first relatedness metric and respective corresponding depths, and selecting the depths at which to render the candidate components based on a result of the comparison. Selecting the depths can be based on, for example, a similarity or closeness between the value of the first relatedness metric with one or more of the potential values for the metric in the look-up table.

Example 8 can include, and can optionally be combined with any one or more of Examples 1-7 to include, rendering an audio output signal for the listener at the first listener position using the candidate components, wherein rendering the audio output signal includes using an HRTF renderer circuit or wavefield synthesis circuit to process the spatial audio signals according to the determined depths.

Example 9 can include, and can optionally be combined with any one or more of Examples 1-8 to include, the spatial audio signals comprise multiple time-frequency signals and wherein the identifying the respective candidate components of the virtual source includes identifying candidate components corresponding to discrete frequency bands in the time-frequency signals, and wherein the determining the first relatedness metric includes for the candidate components corresponding to the discrete frequency bands.

Example 10 can include, and can optionally be combined with any one or more of Examples 1-9 to include, receiving information about an updated position of the listener, and determining different updated depths at which to render the candidate components from the spatial audio signals for the listener at the updated position such that the listener at the updated position perceives the virtual source substantially at a position corresponding to the intended depth relative to the first listener position.

Example 11 can include, and can optionally be combined with any one or more of Examples 1-10 to include, receiving a first spatial audio signal with audio information corresponding to a first depth, and receiving a second spatial audio signal with audio information corresponding to a second depth. In Example 11, determining the depths at which to render the candidate components includes determining an intermediate depth between the first and second depths, and the first and second spatial audio signals comprise (1) near-field and far-field submixes, respectively, or (2) first and second ambisonic signals, respectively.

Example 12 can include, and can optionally be combined with any one or more of Examples 1-11 to include, determining the intended depth using one or more of depth-indicating metadata associated with the two or more spatial audio signals and depth-indicating information implied by a context or content of the two or more spatial audio signals.

Example 13 can include, and can optionally be combined with any one or more of Examples 1-12 to include, generating a consolidated source signal for the virtual source using the determined depths and the candidate components.

Example 14 can include, and can optionally be combined with any one or more of Examples 1-13 to include, determining whether each of the candidate components of the virtual source includes a directional characteristic, and if a particular one of the candidate components lacks a directional characteristic, then assigning a directional characteristic for the particular one of the candidate components based on a directional characteristic from a different one of the candidate components of the same virtual source.

Example 15 can include or use subject matter such as a system for processing audio information to position a virtual audio source to be rendered at an intended depth relative to a listener position, the virtual source including information from two or more spatial audio signals configured to be spatially rendered together relative to a first listener position, and each of the spatial audio signals corresponding to a different depth relative to a reference position. Example 15 can include an audio signal depth processor circuit configured to: identify, in each of the spatial audio signals, respective candidate components of the virtual source, determine a first relatedness metric for the identified candidate components of the virtual source from the spatial audio signals, and using the first relatedness metric, determine depths at which to render the candidate components from the spatial audio signals for a listener at the first listener position such that the listener at the first listener position perceives the virtual source substantially at the intended depth. The system of Example 15 can optionally be configured to perform one or more of the methods, steps, or processes of Examples 1-14.

Example 16 can include, and can optionally be combined with the subject matter of Example 15 to include, a rendering circuit configured to provide an audio output signal for the listener at the first listener position using the candidate components, wherein the audio output signal is provided using HRTF or wavefield synthesis processing of the spatial audio signals according to the determined depths.

Example 17 can include, and can optionally be combined with Examples 15 or 16 to include, a listener head tracker configured to sense information about an updated position of the listener. In Example 17, the processor circuit can be configured to determine different updated depths at which to render the candidate components from the spatial audio signals for the listener at the updated position such that the listener at the updated position perceives the virtual source substantially at the intended depth relative to the first listener position.

Example 18 can include or use subject matter such as a method for positioning a virtual source to be rendered at an intended depth relative to a listener position, the virtual source based on information from one or more spatial audio signals and each of the spatial audio signals corresponds to a respective different reference depth relative to a reference position. Example 18 can include identifying, in each of multiple spatial audio signals, respective candidate components of the virtual source, determining a first relatedness metric for the identified candidate components of the virtual source from the spatial audio signals, and determining a confidence for the first relatedness metric, the confidence indicating a belongingness of the one or more candidate components to the virtual source. In Example 18, when the first relatedness metric indicates a correspondence in content and/or location between the identified candidate components, the example includes determining first depths at which to render the candidate components for a listener at the first listener position such that the listener perceives the virtual source substantially at the intended depth, wherein at least one of the determined first depths is other than its corresponding reference depth. In Example 18, when the first relatedness metric indicates a non-correspondence in content or location between the identified candidate components, the example includes determining second depths at which to render the candidate components for the listener at the first listener position such that the listener perceives the virtual source substantially at the intended depth, wherein the determined second depths correspond to the reference depths. The method of Example 18 can optionally be performed, in whole or in part, by various systems, such as including the system of Example 15.

Example 19 can include, and can optionally be combined with the subject matter of Example 18 to include, determining the confidence for the first relatedness metric includes using information about a trend, a moving average, or a smoothed feature of the candidate components.

Example 20 can include, and can optionally be combined with Examples 18 or 19 to include, determining the first depths at which to render the candidate components includes proportionally adjusting the reference depths based on the determined confidence, wherein the proportionally adjusting includes positioning the spatial audio signal components along a depth spectrum from their respective reference positions to the intended depth.

Each of these Examples can be used alone or combined in various combinations and permutations.

The above detailed description includes references to the accompanying drawings, which form a part of the detailed description. The drawings show specific embodiments by way of illustration. These embodiments are also referred to herein as "examples." Such examples can include elements in addition to those shown or described. Moreover, the subject matter may include any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method for positioning a virtual source to be rendered at an intended depth relative to a listener position, the virtual source including information from two or more spatial audio submix signals configured to be spatially rendered together relative to a first listener position, and each of the spatial audio submix signals corresponds to a respective different reference depth relative to a reference position, the method comprising:

identifying, in each of the spatial audio submix signals, respective candidate components of the virtual source;

determining a first relatedness metric for the identified candidate components of the virtual source from the spatial audio submix signals; and using the first relatedness metric, determining depths other than the respective reference depths of the spatial audio submix signals at which to render the candidate components from the spatial audio submix signals for a listener at the first listener position such that the listener at the first listener position perceives the virtual source substantially at the intended depth.

2. The method of claim 1, further comprising determining a confidence for the first relatedness metric, the confidence indicating a belongingness of the one or more candidate components to the virtual source; and wherein determining the depths at which to render the candidate components includes proportionally adjusting the depths based on the determined confidence, wherein the proportionally adjusting includes positioning the spatial audio signal components along a depth spectrum from their respective reference positions to the intended depth.

3. The method of claim 2, wherein determining the confidence for the first relatedness metric includes using information about a trend, moving average, or smoothed feature of the candidate components.

4. The method of claim 2, wherein determining the confidence for the first relatedness metric includes determining whether respective spatial distributions or directions of two or more of the candidate components correspond.

5. The method of claim 2, wherein determining the confidence for the first relatedness metric includes determining a correlation between at least two of the candidate components of the virtual source.

6. The method of claim 1, wherein determining the first relatedness metric includes using a ratio of respective signal levels of two of the candidate components.

7. The method of claim 1, wherein determining the depths at which to render the candidate components includes:

comparing a value of the first relatedness metric with values in a look-up table that includes potential values for the first relatedness metric and respective corresponding depths, and selecting the depths at which to render the candidate components based on a result of the comparison.

8. The method of claim 1, further comprising rendering an audio output signal for the listener at the first listener position using the candidate components, wherein rendering the audio output signal includes using an HRTF renderer circuit or wavefield synthesis circuit to process the spatial audio submix signals according to the determined depths.

9. The method of claim 1, wherein the spatial audio submix signals comprise multiple time-frequency signals and wherein the identifying the respective candidate components of the virtual source includes identifying candidate components corresponding to discrete frequency bands in the time-frequency signals, and wherein the determining the first relatedness metric includes for the candidate components corresponding to the discrete frequency bands.

10. The method of claim 1, further comprising receiving information about an updated position of the listener, and determining different updated depths at which to render the candidate components from the spatial audio submix signals for the listener at the updated position such that the listener at the updated position perceives the virtual source substantially at a position corresponding to the intended depth relative to the first listener position.

11. The method of claim 1, further comprising:

receiving a first spatial audio submix signal with audio information corresponding to a first depth; and receiving a second spatial audio submix signal with audio information corresponding to a second depth;

wherein the determining the depths at which to render the candidate components includes determining an intermediate depth between the first and second depths; and wherein the first and second spatial audio submix signals comprise (1) near-field and far-field submixes, respectively, or (2) first and second ambisonic signals, respectively.

12. The method of claim 1, further comprising determining the intended depth using one or more of depth-indicating metadata associated with the two or more spatial audio submix signals and depth-indicating information implied by a context or content of the two or more spatial audio submix signals.

13. The method of claim 1, further comprising generating a consolidated source signal for the virtual source using the determined depths and the candidate components.

14. The method of claim 1, further comprising:

determining whether each of the candidate components of the virtual source includes a directional characteristic; and if a particular one of the candidate components lacks a directional characteristic, then assigning a directional characteristic for the particular one of the candidate components based on a directional characteristic from a different one of the candidate components of the same virtual source.

15. A system for processing audio information to position a virtual audio source to be rendered at an intended depth relative to a listener position, the virtual source including information from two or more spatial audio submix signals configured to be spatially rendered together relative to a first listener position, and each of the spatial audio submix signals corresponds to a respective different reference depth relative to a reference position, the system comprising:

an audio signal depth processor circuit configured to:

identify, in each of the spatial audio submix signals, respective candidate components of the virtual source;

determine a first relatedness metric for the identified candidate components of the virtual source from the spatial audio submix signals; and using the first relatedness metric, determine depths other than the respective reference depths of the spatial audio submix signals at which to render the candidate components from the spatial audio submix signals for a listener at the first listener position such that the listener at the first listener position perceives the virtual source substantially at the intended depth.

16. The system of claim 15, further comprising a rendering circuit configured to provide an audio output signal for the listener at the first listener position using the candidate components, wherein the audio output signal is provided using HRTF binaural/transaural or wavefield synthesis processing of the spatial audio submix signals according to the determined depths and characteristics of a playback system.

17. The system of claim 15, further comprising a listener head tracker configured to sense information about an updated position of the listener;

wherein the processor circuit is configured to determine different updated depths at which to render the candidate components from the spatial audio submix signals for the listener at the updated position such that the listener at the updated position perceives the virtual source substantially at the intended depth relative to the first listener position.

18. A method for positioning a virtual source to be rendered at an intended depth relative to a listener position, the virtual source based on information from one or more spatial audio signals and each of the spatial audio signals corresponds to a respective different reference depth relative to a reference position, the method comprising:
  identifying, in each of multiple spatial audio signals, respective candidate components of the virtual source;
  determining a first relatedness metric for the identified candidate components of the virtual source from the spatial audio signals; and
  determining a confidence for the first relatedness metric, the confidence indicating a belongingness of the one or more candidate components to the virtual source; and
  when the confidence for the first metric indicates a correspondence in content and/or location between the identified candidate components, determining first depths at which to render the candidate components for a listener at the first listener position such that the listener perceives the virtual source substantially at the intended depth, wherein at least one of the determined first depths is other than its corresponding reference depth; and
  when the confidence for the first relatedness metric indicates a non-correspondence in content or location between the identified candidate components, determining second depths at which to render the candidate components for the listener at the first listener position such that the listener perceives the virtual source substantially at the intended depth, wherein the determined second depths correspond to the reference depths.

19. The method of claim 18, wherein determining the confidence for the first relatedness metric includes using information about a trend, moving average, or smoothed feature of the candidate components.

20. The method of claim 18, wherein determining the depths at which to render the candidate components includes proportionally adjusting the reference depths based on the determined confidence, wherein the proportionally adjusting includes positioning the spatial audio signal components along a depth spectrum from their respective reference positions to the intended depth.

* * * * *